US012638823B2

(12) United States Patent
　　Mirth

(10) Patent No.: US 12,638,823 B2
(45) Date of Patent: May 26, 2026

(54) MULTIFUNCTIONAL INPUT DEVICE FOR A ROBOT ARM

(71) Applicant: Universal Robots A/S, Odense S (DK)

(72) Inventor: Jos Mirth, Odense S (DK)

(73) Assignee: Universal Robots A/S, Odense S (DK)

( * ) Notice: Subject to any disclaimer, the term of this patent is extended or adjusted under 35 U.S.C. 154(b) by 334 days.

(21) Appl. No.: 18/030,671

(22) PCT Filed: Sep. 17, 2021

(86) PCT No.: PCT/DK2021/050284

§ 371 (c)(1),
(2) Date: Apr. 6, 2023

(87) PCT Pub. No.: WO2022/073572

PCT Pub. Date: Apr. 14, 2022

(65) Prior Publication Data

US 2023/0418258 A1　　Dec. 28, 2023

(30) Foreign Application Priority Data

Oct. 9, 2020　(DK) ........................... PA 2020 70684

(51) Int. Cl.
　　*G05B 19/409*　　(2006.01)
　　*B25J 9/16*　　(2006.01)
　　*B25J 13/06*　　(2006.01)
(52) U.S. Cl.
　　CPC .......... *G05B 19/409* (2013.01); *B25J 9/1674* (2013.01); *B25J 13/06* (2013.01); *G05B 2219/39001* (2013.01)
(58) Field of Classification Search
　　CPC . B25J 13/06; B25J 19/06; B25J 9/1656; B25J 9/1674; G05B 19/409;

(Continued)

(56) References Cited

U.S. PATENT DOCUMENTS

| | | | |
|---|---|---|---|
| 4,166,543 | A | 9/1979 | Dahlstrom |
| 4,398,110 | A | 8/1983 | Flinchbaugh et al. |

(Continued)

FOREIGN PATENT DOCUMENTS

| | | |
|---|---|---|
| CN | 103250109 A | 8/2013 |
| CN | 106061427 A | 10/2016 |

(Continued)

OTHER PUBLICATIONS

File History received for European Patent Application No. 21777949.5, mailed on Dec. 20, 2024, 149 pages.

(Continued)

*Primary Examiner* — Wade Miles
*Assistant Examiner* — Zachary Joseph Wallace
(74) *Attorney, Agent, or Firm* — ARENTFOX SCHIFF LLP

(57) ABSTRACT

The invention relates to a robot arm comprising a plurality of robot joints mechanically connecting a robot base to a robot tool flange wherein a robot controller is configured for controlling movement of said plurality of robot joints and thereby movement of said robot tool flange. The robot controller is connected to an interface device comprising an input device via which a user is able to communicate with said robot controller and thereby change mode of operation of the robot arm. The input device is a mechanical multifunctional input device and in response to a first predetermined sequence of activation applied to the input device, the robot controller is arranged to change mode of operation to a stop mode, and in response to a second predetermined sequence of activation applied to the input device, the robot controller is arranged to change mode of operation to a second mode of operation.

41 Claims, 5 Drawing Sheets

(58) Field of Classification Search
    CPC ........... G05B 2219/35468; G05B 2219/35471;
                G05B 2219/35472; G05B 2219/36429;
                G05B 2219/39001; G05B 2219/39445
    See application file for complete search history.

(56)                 References Cited

U.S. PATENT DOCUMENTS

| | | |
|---|---|---|
| 4,678,952 A | 7/1987 | Peterson et al. |
| 4,744,039 A | 5/1988 | Suzuki et al. |
| 4,753,569 A | 6/1988 | Pryor |
| 4,763,531 A | 8/1988 | Dietrich et al. |
| 4,817,017 A | 3/1989 | Kato |
| 5,103,941 A | 4/1992 | Vranish |
| 5,155,423 A | 10/1992 | Karlen et al. |
| 5,220,261 A | 6/1993 | Kempas |
| 5,293,107 A | 3/1994 | Akeel |
| 5,341,289 A | 8/1994 | Lee |
| 5,353,386 A | 10/1994 | Kasagami et al. |
| 5,363,474 A | 11/1994 | Sarugaku et al. |
| 5,495,410 A | 2/1996 | Graf |
| 5,880,956 A | 3/1999 | Graf |
| 6,040,109 A | 3/2000 | Coppens et al. |
| 6,041,274 A | 3/2000 | Onishi et al. |
| 6,070,109 A | 5/2000 | McGee et al. |
| 6,131,296 A | 10/2000 | Faeger |
| 6,212,433 B1 | 4/2001 | Behl |
| 6,212,443 B1 | 4/2001 | Nagata et al. |
| 6,292,715 B1 | 9/2001 | Rongo |
| 6,408,224 B1 | 6/2002 | Okamoto et al. |
| 6,519,860 B1 | 2/2003 | Bieg et al. |
| 6,535,794 B1 | 3/2003 | Raab |
| 6,678,582 B2 | 1/2004 | Waled |
| 6,704,619 B1 | 3/2004 | Coleman et al. |
| 6,822,412 B1 | 11/2004 | Gan et al. |
| 6,837,892 B2 | 1/2005 | Shoham |
| 6,847,922 B1 | 1/2005 | Wampler, II |
| 6,856,863 B1 | 2/2005 | Sundar |
| 6,922,610 B2 | 7/2005 | Okamoto et al. |
| 6,996,456 B2 | 2/2006 | Cordell et al. |
| 7,035,716 B2 | 4/2006 | Harris et al. |
| 7,248,012 B2 | 7/2007 | Takahashi et al. |
| 7,272,524 B2 | 9/2007 | Torgny |
| 7,278,222 B2 | 10/2007 | Maier |
| 7,298,385 B2 | 11/2007 | Kazi et al. |
| 7,300,240 B2 | 11/2007 | Torgny |
| 7,571,025 B2 | 8/2009 | Bischoff |
| 7,643,907 B2 | 1/2010 | Fuhlbrigge et al. |
| 7,756,608 B2 | 7/2010 | Torgny |
| 8,002,716 B2 | 8/2011 | Jacobsen et al. |
| 8,050,797 B2 | 11/2011 | Lapham |
| 8,160,205 B2 | 4/2012 | Saracen et al. |
| 8,255,462 B2 | 8/2012 | Kondo |
| 8,301,421 B2 | 10/2012 | Bacon et al. |
| 8,340,820 B2 | 12/2012 | Nair |
| 8,410,732 B2 | 4/2013 | Kassow et al. |
| 8,428,816 B2 | 4/2013 | Buur et al. |
| 8,457,786 B2 | 6/2013 | Andersson |
| 8,571,706 B2 | 10/2013 | Zhang et al. |
| 8,571,711 B2 | 10/2013 | Jacobsen et al. |
| 8,583,285 B2 | 11/2013 | Aurnhammer et al. |
| 8,614,559 B2 | 12/2013 | Kassow et al. |
| 8,756,973 B2 | 6/2014 | Wallace et al. |
| 8,774,965 B2 | 7/2014 | Weiss et al. |
| 8,779,715 B2 | 7/2014 | Kassow et al. |
| 8,812,155 B2 | 8/2014 | Brethe |
| 9,248,573 B2 | 2/2016 | SøE-Knudsen et al. |
| 9,250,624 B2 | 2/2016 | Zimmermann |
| 9,592,608 B1 | 3/2017 | Bingham et al. |
| 9,696,221 B2 | 7/2017 | Lauzier et al. |
| 9,827,674 B2 | 11/2017 | Tronnier et al. |
| 9,833,897 B2 | 12/2017 | SøE-Knudsen et al. |
| 9,925,662 B1 | 3/2018 | Jules et al. |
| 10,399,232 B2 | 9/2019 | Oestergaard et al. |
| 10,576,629 B2 | 3/2020 | Rohmer et al. |
| 10,639,799 B2 | 5/2020 | Katou et al. |
| D895,704 S | 9/2020 | Johansen |
| D895,705 S | 9/2020 | Johansen |
| D895,706 S | 9/2020 | Johansen |
| D898,090 S | 10/2020 | Johansen |
| 10,850,393 B2 | 12/2020 | Oestergaard et al. |
| D915,487 S | 4/2021 | Sell |
| D924,228 S | 7/2021 | Mirth |
| 11,110,612 B2 | 9/2021 | Masuda et al. |
| D932,485 S | 10/2021 | Mirth |
| D932,486 S | 10/2021 | Mirth |
| D932,487 S | 10/2021 | Mirth |
| 11,173,614 B2 | 11/2021 | Adachi et al. |
| 11,260,543 B2 | 3/2022 | Johansen |
| 11,318,608 B2 | 5/2022 | Motoyoshi et al. |
| 11,474,510 B2 | 10/2022 | Oestergaard et al. |
| 11,796,045 B2 | 10/2023 | Johansen |
| 11,839,979 B2 | 12/2023 | Rosenlund et al. |
| 11,964,389 B2 | 4/2024 | Johansen |
| 12,011,824 B2 | 6/2024 | Vraa et al. |
| 2002/0013675 A1 | 1/2002 | Knoll et al. |
| 2003/0120391 A1 | 6/2003 | Saito |
| 2004/0078114 A1 | 4/2004 | Cordell et al. |
| 2004/0172164 A1 | 9/2004 | Habibi et al. |
| 2004/0189631 A1 | 9/2004 | Kazi et al. |
| 2004/0212626 A1 | 10/2004 | Lyxzen et al. |
| 2005/0080515 A1 | 4/2005 | Watanabe et al. |
| 2005/0267637 A1 | 12/2005 | Lapham |
| 2005/0273198 A1 | 12/2005 | Bischoff |
| 2005/0273200 A1 | 12/2005 | Hietmann et al. |
| 2006/0069466 A1 | 3/2006 | Kato et al. |
| 2006/0125806 A1 | 6/2006 | Voyles et al. |
| 2006/0163939 A1 | 7/2006 | Kuramochi et al. |
| 2006/0178775 A1 | 8/2006 | Zhang et al. |
| 2006/0201010 A1 | 9/2006 | Maier et al. |
| 2007/0142823 A1 | 6/2007 | Prisco et al. |
| 2008/0004632 A1 | 1/2008 | Sutherland et al. |
| 2008/0140258 A1 | 6/2008 | Ueno et al. |
| 2008/0188983 A1 | 8/2008 | Ban et al. |
| 2008/0188986 A1 | 8/2008 | Hoppe |
| 2008/0319557 A1 | 12/2008 | Summers et al. |
| 2009/0076655 A1 | 3/2009 | Blondel et al. |
| 2009/0157226 A1 | 6/2009 | de Smet |
| 2009/0259337 A1 | 10/2009 | Harrold et al. |
| 2009/0289591 A1 | 11/2009 | Kassow et al. |
| 2010/0145520 A1 | 6/2010 | Gerio et al. |
| 2010/0241270 A1 | 9/2010 | Eliuk et al. |
| 2010/0312392 A1 | 12/2010 | Zimmermann |
| 2011/0022216 A1 | 1/2011 | Andersson |
| 2011/0106305 A1 | 5/2011 | Brethe |
| 2011/0160910 A1 | 6/2011 | Preisinger et al. |
| 2011/0213497 A1 | 9/2011 | Nair |
| 2011/0224826 A1 | 9/2011 | Maehara et al. |
| 2012/0130541 A1 | 5/2012 | Szalek |
| 2012/0210817 A1 | 8/2012 | Kassow et al. |
| 2013/0013108 A1 | 1/2013 | Jacobsen et al. |
| 2013/0079928 A1 | 3/2013 | Soee-Knudsen et al. |
| 2013/0231778 A1 | 9/2013 | Hallundbaek |
| 2013/0255426 A1 | 10/2013 | Kassow et al. |
| 2014/0039681 A1 | 2/2014 | Bowling et al. |
| 2014/0107843 A1 | 4/2014 | Okazaki |
| 2014/0114477 A1* | 4/2014 | Sato .................... G05B 19/423 |
| | | 700/250 |
| 2015/0204742 A1 | 7/2015 | Draisey |
| 2015/0217445 A1 | 8/2015 | Hietmann et al. |
| 2015/0239120 A1 | 8/2015 | Yamamoto |
| 2016/0052128 A1 | 2/2016 | Zimmermann et al. |
| 2016/0121484 A1 | 5/2016 | Ikeda et al. |
| 2016/0136805 A1 | 5/2016 | Søe-Knudsen et al. |
| 2016/0375588 A1 | 12/2016 | Ueberle et al. |
| 2017/0007336 A1 | 1/2017 | Tsuboi et al. |
| 2017/0057095 A1 | 3/2017 | Oestergaard et al. |
| 2018/0029221 A1 | 2/2018 | Tanaka et al. |
| 2018/0043525 A1 | 2/2018 | Su et al. |
| 2018/0079090 A1 | 3/2018 | Koenig et al. |
| 2018/0080841 A1 | 3/2018 | Cordoba et al. |
| 2018/0178380 A1 | 6/2018 | Oestergaard et al. |
| 2018/0215050 A1 | 8/2018 | Kassow |
| 2018/0304460 A1 | 10/2018 | Lin |
| 2019/0034025 A1 | 1/2019 | Izumi et al. |

(56) References Cited

U.S. PATENT DOCUMENTS

| | | | |
|---|---|---|---|
| 2019/0086907 A1 | 3/2019 | Oestergaard et al. | |
| 2019/0126489 A1 | 5/2019 | Wada et al. | |
| 2019/0160686 A1 | 5/2019 | Riedel | |
| 2019/0176334 A1 | 6/2019 | Zhou et al. | |
| 2020/0171658 A1 | 6/2020 | Kielsholm Thomsen | |
| 2020/0340569 A1 | 10/2020 | Johansen | |
| 2020/0391393 A1 | 12/2020 | Johansen | |
| 2021/0039254 A1 | 2/2021 | Oestergaard et al. | |
| 2021/0086374 A1 | 3/2021 | Brandt et al. | |
| 2021/0237284 A1 | 8/2021 | Vraa et al. | |
| 2021/0260757 A1 | 8/2021 | Nielsen et al. | |
| 2021/0260759 A1 | 8/2021 | Knudsen et al. | |
| 2021/0323148 A1* | 10/2021 | Matsuda | B25J 9/1607 |
| 2022/0161433 A1 | 5/2022 | Brandt et al. | |
| 2022/0184810 A1 | 6/2022 | Brandt et al. | |
| 2022/0226993 A1 | 7/2022 | Madsen | |
| 2022/0379463 A1 | 12/2022 | Hansen | |
| 2022/0379468 A1 | 12/2022 | Hansen | |
| 2022/0388156 A1 | 12/2022 | Hansen | |
| 2023/0035296 A1 | 2/2023 | Søe-Knudsen et al. | |
| 2023/0052996 A1 | 2/2023 | Thomsen | |
| 2023/0191603 A1 | 6/2023 | Thomsen et al. | |
| 2023/0405819 A1 | 12/2023 | Kravchenko et al. | |
| 2023/0405822 A1 | 12/2023 | Kravchenko et al. | |
| 2023/0418258 A1 | 12/2023 | Mirth | |
| 2024/0351209 A1 | 10/2024 | Graabaek et al. | |

FOREIGN PATENT DOCUMENTS

| | | | |
|---|---|---|---|
| CN | 107072730 A | 8/2017 | |
| CN | 109275333 A | 1/2019 | |
| CN | 110303499 A | 10/2019 | |
| CN | 111670011 A | 9/2020 | |
| DE | 2735632 A1 | 2/1978 | |
| DE | 19858154 A1 | 6/2000 | |
| DE | 10048096 A1 | 4/2002 | |
| DE | 10157174 A1 | 6/2003 | |
| DE | 10239694 A1 | 3/2004 | |
| DE | 10361132 A1 | 1/2005 | |
| DE | 102006061752 A1 | 7/2008 | |
| DE | 102008027008 A1 | 12/2009 | |
| DE | 102015106227 B3 | 5/2016 | |
| EP | 0850730 A1 | 7/1998 | |
| EP | 1505464 A2 | 2/2005 | |
| EP | 1632318 A2 | 3/2006 | |
| EP | 1696289 A1 | 8/2006 | |
| EP | 1724676 A1 | 11/2006 | |
| EP | 1764192 A1 | 3/2007 | |
| EP | 2258521 A1 | 12/2010 | |
| EP | 2453325 A1 | 5/2012 | |
| EP | 2641136 A1 | 9/2013 | |
| EP | 3015932 A1 | 5/2016 | |
| EP | 2864085 B1 | 11/2016 | |
| EP | 3572194 A1 | 11/2019 | |
| ES | 2548037 T3 | 10/2015 | |
| JP | 01-146645 A | 6/1989 | |
| JP | 02-250782 A | 10/1990 | |
| JP | 06-190753 A | 7/1994 | |
| JP | 10-254527 A | 9/1998 | |
| JP | 2001-050741 A | 2/2001 | |
| JP | 2002-120174 A | 4/2002 | |
| JP | 2004-049731 A | 2/2004 | |
| JP | 2004-148466 A | 5/2004 | |
| JP | 2004-316722 A | 11/2004 | |
| JP | 2005-148789 A | 6/2005 | |
| JP | 2005-342885 A | 12/2005 | |
| JP | 2016-168650 A | 9/2016 | |
| MX | 2013005425 A | 8/2013 | |
| RU | 2013125348 A | 12/2014 | |
| WO | 97/00454 A1 | 1/1997 | |
| WO | 2004/071717 A1 | 8/2004 | |
| WO | 2007/099511 A2 | 9/2007 | |
| WO | 2008/037567 A1 | 4/2008 | |
| WO | 2009/107358 A1 | 9/2009 | |
| WO | 2012/066025 A1 | 5/2012 | |
| WO | 2013/192500 A2 | 12/2013 | |
| WO | 2014/110682 A1 | 7/2014 | |
| WO | 2019/102746 A1 | 5/2019 | |

OTHER PUBLICATIONS

Search Report and Search Opinion received for Danish Application No. PA 202070684, mailed on Apr. 28, 2021, 7 pages.

Universal Robots., "User Manual UR3/CB3", Version 3.1, 2009, 181 pages.

Bennett et al., "Autonomous Calibration of Single-Loop Closed Kinematic Chains Formed by Manipulators with Passive Endpoint Constraints," IEEE Transactions of Robotics and Automation, 7(5):597-606 (1991), 10 pages.

Definition of Flange, Merriam-Webster Dictionary, Jun. 23, 2015, URL: http:/ /www.merriamwebster.com/dictionary/flange, 4 pages.

Definition of Robot, Dictionary.com, Jun. 23, 2015, URL: http:/ /dictionarv.reference.com/browse/robot?s=t, 5 pages.

Jeremy A. Marvel et al.: "Implementing speed and separation monitoring in collaborative robot workcells", Robotics and Computer Integrated Manufacturing, Elsevier Science Publishers BV., Barking, GB, vol. 44, Aug. 27, 2016, pp. 144-155, ISSN: 0736-5845, DOI: 10.1016/J.RCIM.2016.08.001, XP029830786.

Maier, C., Aufbau und Einsatz von Industrierobotern, Design and Use of Industrial Robots, Lecture Notes, 3rd Edition, Institute for Production Technology, 11 pages (1996). [English translation unavaila].

Schou C et al., "Human-robot Interface for Instructing Industrial Tasks Using Kinesthetic Teaching", IEEE ISR 2013, (Oct. 24, 2013) [XP032546561].

User Manual KR C2 / KR C3 Expert Programming, KUKA System Software (KSS) Release 5.2, Version 00: 183 pages (2003).

International Search Report for International Patent Application No. PCT/DK2021/050284, mailed Dec. 23, 2021, 5 pages.

Written Opinion for International Patent Application No. PCT/DK2021/050284, mailed Dec. 23, 2021, 14 pages.

Office Action received for Chinese Patent Application No. 202180065475.7, mailed on Nov. 13, 2025, 15 pages (7 pages of English Translation and 8 pages of Original Document).

* cited by examiner

MULTIFUNCTIONAL INPUT DEVICE FOR A ROBOT ARM

CROSS-REFERENCE TO RELATED APPLICATIONS

This application is a national stage entry of PCT Application No. PCT/DK2021/050284, which was filed on Sep. 17, 2021. PCT Application No. PCT/DK2021/050284 claims priority to Denmark Patent Application No. PA202070684 which was filed on Oct. 9, 2020. This application claims priority to PCT Application No. PCT/DK2021/050284 and to Denmark Patent Application No. PA202070684. The contents of PCT/DK2021/050284 and Denmark Patent Application No. PA202070684 are incorporated herein by reference.

FIELD OF THE INVENTION

The present invention relates to a robot arm having a robot controller controlling a plurality of robot joints of the robot arm connecting a robot base and a robot tool flange, where a user can change mode of operation of the robot arm from a multifunctional input device comprised by an interface device and a method of changing mode of a robot arm by said multifunctional input device.

BACKGROUND OF THE INVENTION

Robot arms comprising a plurality of robot joints and links where motors or actuators can move part of the robot arm in relation to each other are known in the field of robotics. Typically, the robot arm comprises a robot base which serves as a mounting base for the robot arm; and a robot tool flange where to various tools can be attached. A robot controller is configured to control the robot joints in order to move the robot tool flange in relation to the base. For instance, in order to instruct the robot arm to carry out a number of working instructions. The robot joints may be rotational robot joints configured to rotate parts of the robot arm in relation to each other, prismatic joints configured to translate parts of the robot arm in relation to each other and/or any other kind of robot joints configured to move parts of the robot arm in relation to each other.

Typically, the robot controller is configured to control the robot joints based on a dynamic model of the robot arm, where the dynamic model defines a relationship between the forces acting on the robot arm and the resulting accelerations of the robot arm. Often, the dynamic model comprises a kinematic model of the robot arm, knowledge about inertia of the robot arm and other parameters influencing the movements of the robot arm. The kinematic model defines a relationship between the different parts of the robot arm, and may comprise information of the robot arm such as, length, size of the joints and links and can for instance be described by Denavit-Hartenberg parameters or like. The dynamic model makes it possible for the controller to determine which torques and/or forces the joint motors or actuators shall provide in order to move the robot joints for instance at specified velocity, acceleration or in order to hold the robot arm in a static posture.

Robot arms need to be programmed by a user or a robot integrator which defines various instructions for the robot arm, such as predefined moving patterns and working instructions such as gripping, waiting, releasing, screwing instructions. The instruction can be based on various sensors or input signals which typically provide a triggering signal used to stop or start at a given instruction. The triggering signals can be provided by various indicators, such as safety curtains, vision systems, position indicators, etc.

Typically, it is possible to attach various end effectors to the robot tool flange or other parts of the robot arm, such as grippers, vacuum grippers, magnetic grippers, screwing machines, welding equipment, dispensing systems, visual systems, etc. When providing such end effector, it is necessary to provide an estimation of the payload information that such end effector provides to the robot arm. Typically, the user manually enters the payload information into the kinematic model where after the controller can take the payload information into account when controlling the robot. Typically, the payload information comprises information in relation to the weight and pose of the object, where pose of the object relates to the position and orientation of the object in relation to the robot arm e.g. the robot tool flange. The pose can for instance be indicated as the position of the center of mass of the object in relation to the robot tool flange. Many users have difficulties setting the correct payload information or ignore/forget to set it at all.

Many robot arms can be set into a so call free-drive or Zero G mode of operation, where a user manually can change the posture of the robot arm by pushing or pulling the robot arm and where the robot controller is configured to hold the robot arm in a posture when a user is not pushing or pulling the robot arm. In the free-drive mode of operation, the robot controller is configured to control the motor torque provided by the motor of the robot joints based on joint encoders and a dynamic model of the robot. Typically, the joint encoders provide a signal indicating the joint angle of each of the joints and the controller can based on the joint angles and a dynamic model of the robot calculate the force needed to maintain the robot arm in a posture. When a user pushes or pulls the robot arm a change in joint angle can be registered and the robot controller is configured to allow movement of the robot. In some embodiment the controller can be configured to apply a motor torque to the joint motors when a change in joint angle is registered for instance in order to assist movement of the robot arm, apply some resistance that the user need to overcome in order to change the posture of the robot arm. Some robot arms comprise torque sensors configured to indicate the torque applied to each of the robot joints and the robot controller can be configured to control the motor torques applied to the robot joints based on the torques applied to the robot joint.

SUMMARY OF THE INVENTION

The invention relates to a robot arm comprising a plurality of robot joints mechanically connecting a robot base to a robot tool flange wherein a robot controller is configured for controlling movement of said plurality of robot joints and thereby movement of said robot tool flange. Said robot controller is communicatively connected to an interface device comprising an input device via which a user is able to communicate with said robot controller and thereby change mode of operation of said robot arm, wherein said input device is a mechanical multifunctional input device and in response to a first predetermined sequence of activation applied to said mechanical multifunctional input device by said user, said robot controller is arranged to change mode of operation to a stop mode, and in response to a second predetermined sequence of activation applied to said mechanical multifunctional input device by said user, said robot controller is arranged to change mode of operation to a second mode, wherein said robot controller is configured to change mode of operation in response to any of said first predetermined sequence of activation and said second predetermined sequence of activation when said robot arm is in a third mode of operation. (Original paragraph 0007)

Implementing a mechanical multifunctional input device and establish predetermined sequences of activation for different purposes including free-drive mode is advantageous in that it has the effect, that safety is increased in that a user cannot by mistake activate the second mode which in an embodiment is free-drive mode by pushing a "free-drive"/second mode button. Additionally, a more cost effective interface device for a robot arm can be provided, as the mechanical multifunctional input device can be configured for different-purposes and thereby the number of input devices provided at the interface device can be reduced. Additional second modes could be any suitable modes in which the robot arm can operate such as move mode, or any suitable predefined operations such as returning the robot arm to "home" or other locations with predefined positions of the robot joints.

Implementing a mechanical multifunctional input device and establish predetermined sequences of activation for different purposes including free-drive mode is advantageous in that it has the effect, that it becomes easier for the experienced user to control and especial to integrate the robot arm into a robot cell. The learning curve is harder, but once the predetermined sequences are learned, the user only needs to have his fingers on one and the same button and does not have to look down to the interface device to be sure to hit the correct of a plurality of buttons.

Further, having several predetermined sequences of steps enables additional modes to be accessed through a single multifunctional input device, which is advantageous. A conventional input device such as a 3-position enabling button typically has a release position, a middle position, and a fully activated position. As the release position and fully activated position may typically be in use for a stop mode, such a conventional input device typically-only permits two different modes. In contrast, the invention may permit changing between three different modes, or even more than three different modes, via a single input device, which is advantageous. A stop mode may also be referred to as a first mode.

A mode of operation may alternatively just be referred to as a mode. E.g., a second mode of operation may be referred to as a second mode, a third mode of operation may be referred to as a third mode, a stop mode of operation may be referred to as a stop mode, a teach mode of operation may be referred to as a teach mode, a test mode of operation may be referred to as a test mode, etc.

A third mode of operation is a mode of operation. It may typically be different from the second mode of operation and the stop mode of operation. The third mode may for example be a run mode, teach mode or a test mode.

In some embodiments of the invention, the third mode of operation may not necessarily refer to a single particular mode of operation. For example, when a first predetermined sequence of activation is applied to the mechanical multifunctional input device, the robot controller is arranged to change mode of operation to a stop mode, coming from a third mode of operation, which, in principle, can be any other mode of operation. During use, a robot arm will typically be brought to many different modes, such as teach mode, test mode, and run mode. In embodiments of the invention, the third mode is not restricted to being a particular one of these modes. Thus, when the first predetermined sequence of activation is applied, the mode of operation may be changed to a stop mode, coming from any mode, or, alternatively, a subset of modes. Similarly, when the second predetermined sequence of activation is applied, the mode of operation may be changed to a stop mode, coming from any mode, or, alternatively, a subset of modes. In other words, the third mode may be any mode which is different from the stop mode and the second mode (at least in some embodiments of the invention).

In some embodiments of the invention, the second mode may not necessarily refer to a single particular mode of operation either, in similarity to how the third mode may not necessarily refer to a single particular mode of operation. The second mode may rely on whichever the present mode (third mode) is. For example, when the third mode is a teach mode then the mode of operation is changed to a free-drive mode, and when the third mode is a test mode then the mode of operation is changed to move mode (in response to a second predetermined sequence of activation applied to the mechanical multifunctional input device).

According to an exemplary embodiment, said robot controller is configured to stop operation of the robot arm in response to a first predetermined sequence of activation of said mechanical multifunctional input device when said robot arm is in teach mode or test mode.

This is advantageous in that it has the effect, that operation of the robot arm cannot be stopped by the interface device by mistake if not the robot arm is in the teach mode. Further, the feature of stopping the operation of the robot arm via a predetermined sequence of activation of the interface device is mainly usable in the teach mode or test mode where the robot arm are installed or new software are tested, e.g. in a test mode where a sequence of the robot arm program is executed in order for the user to test if the robot arm program works as intended.

Teach mode should be understood as the mode in which the user is able to change the robot control software and robot arm control should be understood as the software executed by the robot controller to enable operation of the robot arm. The mode of the robot arm control can e.g. be teach mode or test mode where the software can be changed (teach), for instance by teaching waypoints define program sequences in a programming tool or tested (test mode) where at least a part of the robot program can be tested by executing a part of the program, e.g. a reduced speed. Further the robot arm can be in operation mode where the robot arm is executing the robot program in normal operation.

According to an exemplary embodiment, said stop mode of operation is configured to terminate operation of said robot arm and thereby bring said robot arm to standstill.

Bringing the robot arm in stop mode, should be understood as stopping operation of the robot arm. Hence, the type of stop mode is not important, what is important is to stop the robot from operation. One way of stopping is to keep brakes of the robot joints applied while keeping the robot arm powered on. This is advantageous in that it has the effect, that after activation of a first part of the first predetermined sequence of activation of the input device (such as applying a certain force to the input device), the user is able to, in a safe manner, monitor the operation of the robot arm closely (e.g. physically in the time period between activation of the first and second parts of the first predetermined sequence). While monitoring the robot arm in the time up to the activation of the second part, the use is able to bring the robot arm to standstill immediately by applying the second part of the first predetermined sequence e.g. by releasing or applying a force to the input device and thereby completing the first predetermined sequence.

According to an exemplary embodiment, said second mode is a free-drive mode of operation configured to:

maintain said robot arm in a static posture when only gravity is acting on said robot arm;

allow change in posture of said robot arm when an external force different from gravity is applied to said robot arm.

Bringing the robot arm in free-drive mode, should be understood as bringing the robot arm in a mode in which the user is able to move the robot arm i.e. the joints by applying a limited force to the robot arm. This is advantageous in that it has the effect, that a user is able to modify several (if not all) robot joints e.g. to record a preferred route for the robot arm to follow via waypoints, fine tune the position of the robot tool, etc.

According to an exemplary embodiment, said mechanical multifunctional input device is a physical button having at least a release position, a middle position and a fully activated position.

This is advantageous in that it has the effect, that the user may start a predetermined sequence by applying force activating the middle position of the mechanic input device and complete the predetermined sequence that stops operation of the robot arm by either releasing or fully activating the mechanical input device. Hence, the two possible reflexes from a user in a dangerous situation will fulfil the predetermined sequence and stop the operation of the robot arm.

According to an exemplary embodiment, said first predetermined sequence of activation includes the following steps:

applying a force to said mechanical multifunctional input device forcing said mechanical multifunctional input device to said middle position, providing a first electric signal to said robot controller based on which said robot controller starts a timer, a pause, where said user maintains said mechanical multifunctional input device in said middle position for at least a determined first period of time, wherein said robot controller is configured to allow operation of said robot arm when said determined first period of time has passed, and either:

releasing said applied force on said mechanical multifunctional input device allowing said mechanical multifunctional input device to return to said release position, thereby changing said first electric signal to said robot controller which base on said change of said first electric signal is configured to stop operation of said robot arm, or increasing said applied force on said mechanical multifunctional input device forcing said mechanical multifunctional input device to said fully activated position, thereby changing said first electric signal to said robot controller which based on said change of said first electric signal is configured to stop operation of said robot arm.

Stopping the operation of the robot arm by a simple sequence of activation of the input device is advantageous in that it has the effect that the robot arm is stopping operation when the user releases or fully presses the input device. Hence no matter the reaction of the user experiencing a hazardous situation the robot arm stops. Note that hazardous may be to the user, to the object handled by the robot arm or the robot arm itself.

Note that the electric signal may be an analogue voltage or a digital representation of the change of the position of the input device.

According to an exemplary embodiment, said robot controller is configured for resetting said timer when said mechanical multifunctional input device is not maintained in said middle position for an initial first period of time, said initial first period of time is more than 0ms and less than said determined first period of time.

This is advantageous in that it has the effect, that thereby unintentional activation of the input device (i.e. activation in less than the initial period of time which may be below 100 ms, or below 75 ms such as 50 ms) does not lead to allowance of operation of the robot arm.

Note that the same time may be used to determine if the initial time and the first period of time has passed. Hence, the timer starts (step S11) when the first electric signal is received by the robot controller upon activation of the input device (step S10) and the initial time may be a defined threshold value of e.g. 75 ms. Because the timer is reset if the robot controller does not reach 75 ms (in this particular example) i.e. if the input device is in middle position less than the 75 ms. If the input device is in middle position more than 75 ms, the robot controller determines if the user is applying sequence one or two by comparing the counter value to the determined first period of time (Step S12).

If the counter reaches the determined first period of time the robot controller allows operation of the robot arm (step S13). The robot controller allows operation of the robot arm as long as the first electric signal is received i.e. as long as the input device is in middle position. Hence, when the position of the input device change and thereby the (first) electric signal, the robot controller then stops operation or the robot arm (step S14), resets timer and is ready to start over from step S10.

According to an exemplary embodiment, said change of said first electric signal upon releasing said applied force results in a second electric signal to the robot controller.

According to an exemplary embodiment, said change of said first electric signal upon increasing said applied force results in a third electric signal to the robot controller.

Being able to provide three different electric signals (analogue or digital) to the robot controller is advantageous in that it has the effect, that various combination of signals can be established and accordingly the robot controller is able to control the robot arm in various different ways depending on the input from the input device.

According to an exemplary embodiment, said determined first period of time is between 10 ms and 2000 ms, preferably between 40 ms and 1000 ms and most preferably between 45 ms and 550 ms such as 200 ms.

The determined period of time between 45 ms and 550 ms is advantageous in that it has the effect that by maintaining the mechanical input device in the middle position between ms and 550 ms this indicates that the intention of the user is to activate the input device according to the first or second predetermined sequence. If the input device is pressed less than e.g. 50 ms, this indicates that the press was made by mistake and if the input device is pressed more than e.g. 50 ms but less than 200 ms this indicates that the user has started applying a second sequence and if the input device is pressed more than 200 ms this indicates that the user has started applying a first sequence. Note that the mentioned times are exemplary and could include other not mentioned time periods.

Further, the duration of the determined period of time between 45 ms and 550 ms is advantageous in that the second predetermined sequence of activation of the input device can be initiated within this period of time. Preferably, the determined period of time is predetermined i.e. determined before the control software program is loaded to the robot controller.

According to an exemplary embodiment, said second determine sequence of activation includes at least one of the following sequences of steps:

forcing said mechanical multifunctional input device to said middle position and subsequently within a time period, the duration of which is less than a determined second period of time, releasing said mechanical multifunctional input device to said release position, forcing said mechanical multifunctional input device to said middle position and subsequently within a time period, the duration of which is less than said determined second period of time, forcing said mechanical multifunctional input device to said fully activated position, forcing said mechanical multifunctional input device to said fully activated position and subsequently within a time period, the duration of which is less than a determined second time period releasing said mechanical multifunctional input device to said release position, or forcing said mechanical multifunctional input device to said fully activated position and subsequently within a time period, the duration of which is less that a determined second time period releasing said mechanical multifunctional input device to said middle position.

Performing the first part of the second predetermined sequence of activation including s step of forcing the input device to middle position faster than the initial period of time but not as long as the determine first period of time of e.g. between 30 ms and 1000 ms such as 200 ms, ensures that the robot controller can distinguish between the first and second sequence i.e. stopping of the robot arm initiated by the first sequence of activation is prioritized over the change of mode initiated by the second predetermined sequence of activation.

Further, if the input device is forced to its fully activated position, the robot controller knows that this is not the initial step of the first sequence but a start of a second (or third) sequence and therefore by the fully activated gesture, the period of time in which the user fully activates the input device is independent of the first period of time.

According to an exemplary embodiment, said determined second period of time is between 10 ms and 2000 ms, preferably between 40 ms and 1000 ms and most preferably between 45 ms and 550 ms such as 200 ms.

According to an exemplary embodiment, at least one of:
  said time period of forcing said mechanical multifunctional input device to said middle position is longer than an initial second period of time;
  said time period of forcing said mechanical multifunctional input device to said fully activated position is longer than an initial second period of time;
and said initial second period of time is more than 0ms and less than said determined second period of time.

According to an exemplary embodiment, said second predetermined sequence of activation further includes at least one of the following steps:

releasing said mechanical multifunctional input device to its release position and subsequently within a third period of time forcing said mechanical multifunctional input device to said fully activated position or to said middle position, or forcing said mechanical multifunctional input device to said fully activated position and subsequently within a third period of time releasing said mechanical multifunctional input device to said release position or to said middle position or forcing said mechanical multifunctional input device to said middle position and subsequently within a third period of time releasing said mechanical multifunctional input device to said release position or forcing said mechanical multifunctional input device to said fully activated position.

According to an exemplary embodiment, said third period of time is between 200 ms and 2000 ms, preferably between 300 ms and 1000 ms and most preferably between 400 ms and 550 ms.

The second period of time may be counted from the timer is started in step S10 or from a reset of the timer in step S12 when the robot controller determines that a second sequence has been initiated by observing that the input device was in the middle position less than the first predetermined period of time.

If the counter exceeds the initial period of time but does not reaches the determined first period of time the robot controller This is advantageous in that the timing of the electric signals from the input device to the robot controller is possible to use by the robot controller to distinguishing between the first sequence leading to stop mode and the second sequence lading to free-drive mode.

Further, depending on the position of the input device (in release, middle or fully pressed) the robot controller may receive different electric signals. If the electric signal is an analogue signal, the voltage may change in dependency of the position and if the electric signal is a digital signal, the digital value may change in dependency of the position.

Hence, in dependency of the received signals from the input device and the timing of these signals, the robot controller is configured to change mode of operation of the robot arm. If the signals or the timing does not comply with the predetermined sequence/timing, the robot controller returns the state machine to step S10 where it is ready to start over again. Accordingly, not change of mode of operation is made.

According to an exemplary embodiment, said robot controller is configured to change mode of operation of said robot arm in response to said second sequence of activation in dependency of the present mode of operation of said robot arm.

This is advantageous in that it has the effect, that several changes of mode of operation of the robot arm can be made with the same second sequence of activation reducing the number of sequences to remember for the user. As an example, could be mentioned, that if the robot arm is in the programming mode, in response to activation of the second sequence, the robot controller may then change mode of operation to free-drive mode.

Another example could be if the robot arm is in the run mode, in response to activation of the second sequence, the robot controller may then move the robot arm to start position. In the situation where the latter example does not require a change of mode of operation, the robot controller simple stays in the present mode of operation and controls the robot arm to a particular position/location. Hence, performing a predetermined sequence of activation such as moving the robot arm to a predetermined position, is considered to be included when referred to a change of mode of operation.

According to an exemplary embodiment, said robot controller is in teach mode configured to change mode of operation of said robot arm to said free-drive mode of operation in response to said second sequence of activation and said robot controller is in test mode configured to change mode of operation of said robot arm to move mode in response to said second sequence of activation, where, in said move mode, said robot controller is configured to bring back said robot arm (101) to a start position.

According to an exemplary embodiment, said robot arm comprises an auxiliary interface device physically separate from said interface device, wherein the auxiliary interface device comprising an auxiliary mechanical multifunctional input device.

This is advantageous in that it has the effect, that a first user can operate/control the robot arm from the teach pendant outside the robot cell and a second user can be in the robot cell with the auxiliary interface device via which the second user can being the robot arm in stop mode by activating the auxiliary input device of the auxiliary interface device according to the first predetermined sequence of activation.

According to an exemplary embodiment, a first part of said first predetermined sequence of activation is activated via said mechanical multifunctional input device or via said auxiliary mechanical multifunctional input device and a second part of said first predetermined sequence of activation is activated via said mechanical multifunctional input device or via said auxiliary mechanical multifunctional input device to stop operation of the robot arm.

This is advantageous in that it has the effect, that both the first and the second user may finish the first predetermined sequence of activation and thereby stop the operation of the robot arm. In one embodiment, for safety reasons both input devices should be in the middle position to allow the robot controller to operated, but only one should be released or in fully pressed position to stop the operation of the robot arm.

According to an exemplary embodiment, said robot controller is configured to bring back said robot arm to a start position in response to a third predetermined sequence of activation of said mechanical multifunctional input device by the user.

This is advantageous in that it has the effect, that for the experienced user familiar with the third predetermined sequence, manoeuvring of the robot arm becomes easier and possible to do with one hand, more specifically, the hand holding the interface device.

Start position should in this embodiment be understood as a predefined location of the robot arm sometimes also in a predetermined posture.

According to an exemplary embodiment, activation of said second and/or third predetermined sequence of activation includes activation of said mechanical multifunctional input device of said interface device and of said auxiliary mechanical multifunctional input device of the auxiliary interface device.

This is advantageous in that it has the effect that it reduces the risk of the user unintentionally activates the second or third sequence of activations of the input device.

According to an exemplary embodiment, said third mode of operation is selected from the list comprising: Run mode, test mode, and teach mode.

This is advantageous in that it has the effect, that independent on which mode the robot arm is operated in, the user can always stop operation and bring the robot arm into stop mode (still power to joint motors) or safety stop mode (joint motors powered off) e.g. during monitoring of the operation of the robot arm by applying the first predetermined sequence of activation of the input device.

According to an exemplary embodiment, said interface device is connected by wire to said robot arm controller.

According to an exemplary embodiment, said interface device is a teach pendant comprising said mechanical multifunctional input device on the side opposite to the side of said interface device comprising a display.

This is advantageous in that it has the effect, that the user can operated the input device with the hand the user uses to hold the interface device.

According to an exemplary embodiment, said third mode of operation is the present mode.

The present mode may be understood as a mode of operation of the robot arm prior to applying a predetermined sequence of activation to the mechanical multifunctional input device. In other words, for example, before applying the first or the second predetermined sequence of activation, the robot arm may be in the present mode, and after applying either the first or the second predetermined sequence of activation, the mode of operation may be either the stop mode or the second mode. An example of a present mode is the third mode.

According to an exemplary embodiment, said robot arm is in said third mode of operation prior to said user communicating with said mechanical multifunctional input device.

According to an exemplary embodiment, said third mode of operation is any of teach mode and test mode.

According to an exemplary embodiment, said robot controller is arranged to change mode of operation to an operation mode in response to applying a first subset of said first predetermined sequence of activation.

According to an exemplary embodiment, said robot controller is arranged to change mode of operation to said operation mode in response to applying a first subset of said second predetermined sequence of activation.

A first subset of a predetermined sequence of activation may be understood as a first part of the predetermined sequence of activation. Typically, a predetermined sequence of activation may have multiple steps, e.g., if the mechanical multifunctional input device is a physical button with a release position, a middle position, and a fully activated position, a sequence of activation may comprise two steps, namely applying a force to move the button from the release position to the middle position, followed by applying more force to move the button from the middle position to the fully activated position. An example of a first subset of a predetermined sequence is thus moving the button from a release position to a middle position.

By having a mode of operation available through a subset of a predetermined sequence of activation is advantageous, since it permits a user to rapidly an easily browse between modes of activation.

According to an exemplary embodiment, said first subset of said first predetermined sequence of activation and said first subset of said second predetermined sequence of activation are the same.

Having the same subset to engage the operation mode simplifies initiation of the operation mode, and generally simplifies operation of the robot arm, which is advantageous. For example, moving a button from a release position to a middle position may be the first step of both the first predetermined sequence of activation and the second predetermined sequence of activation.

According to an exemplary embodiment, said second mode is a move mode. (Original paragraph 0077)

According to an exemplary embodiment, said second mode is a free-drive mode when said third mode of operation is a teach mode.

According to an exemplary embodiment, said second mode is a move mode when said third mode of operation is a test mode.

By having the second mode of operation relying on the third mode of operation, it may be possible to ensure that the mode of operation is only changed to a particular second mode when such a particular change is relevant, which is advantageous.

According to an exemplary embodiment, said robot controller in response to said predetermined first sequence is arranged to change mode of operation to said stop mode when said third mode of operation is at least one of a run mode and a test mode. (Original paragraph 0081)

Moreover, the invention relates to a method of controlling a robot arm via an interface device comprising a mechanical multifunctional input device operated by a user, wherein said interface device is communicatively connected to a robot controller, wherein said method comprising the steps of:

at a first point in time:

establish a first set of electric signals in response to a first predetermined sequence of activation of said mechanical multifunctional input device performed by said user, by said robot controller, receive said first set of electric signals, and based on said first set of electric signals, change mode of operation of said robot arm to a stop mode, at a second point in time:

establish a second set of electric signals in response to a second predetermined sequence of activation of said mechanical multifunctional input device performed by said user, by said robot controller, receive said first set of electric signals, and based on said first set of electric signals, change mode of operation of said robot arm to a second mode of operation, wherein said robot controller is configured to change mode of operation in response to any of said first predetermined sequence of activation and said second predetermined sequence of activation when said robot arm (101) is in a third mode of operation.

According to an exemplary embodiment, the robot arm of the method is the robot arm described in any of the previous paragraphs from original paragraph 0007 through original paragraph 0081.

According to an exemplary embodiment, said robot controller in said free-drive mode of operation is controlling the robot arm so as to:

maintain said robot arm in a static posture when only gravity is acting on said robot arm, and allow change in posture of said robot arm when an external force different from gravity is applied to said robot arm.

Moreover, the invention relates to a robot controller communicatively connected to an interface device comprising an input device via which a user is able to communicate with said robot controller and thereby change mode of operation of a robot arm, wherein said input device is a mechanical multifunctional input device and in response to a first predetermined sequence of activation applied to said mechanical multifunctional input device by said user, said robot controller is arranged to change mode of operation to a stop mode, and in response to a second predetermined sequence of activation applied to said mechanical multifunctional input device by said user, said robot controller is arranged to change mode of operation to a second mode, wherein said robot controller is configured to change mode of operation in response to any of said first predetermined sequence of activation and said second predetermined sequence of activation when said mode of operation is a third mode.

According to an exemplary embodiment, the robot controller is the robot controller described in any of the previous paragraphs from original paragraph 0007 through original paragraph 0077.

Moreover, the invention relates to a robot system comprising:

a robot arm comprising a plurality of robot joints mechanically connecting a robot base to a robot tool flange; and a robot controller configured for controlling movement of said plurality of robot joints and thereby movement of said robot tool flange, wherein said robot controller is communicatively connected to an interface device comprising an input device via which a user is able to communicate with said robot controller and thereby change mode of operation of said robot arm, wherein in response to a first predetermined sequence of activation applied to said mechanical multifunctional input device by said user, said robot controller is arranged to change mode of operation to a stop mode, and in response to a second predetermined sequence of activation applied to said mechanical multifunctional input device by said user, said robot controller is arranged to change mode of operation to a second mode, wherein said robot controller is configured to change mode of operation in response to any of said first predetermined sequence of activation and said second predetermined sequence of activation when said robot arm is in a third mode of operation.

According to an exemplary embodiment, the robot arm of the robot system is the robot arm described in any of the previous paragraphs from original paragraph 0007 through original paragraph 0081.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION OF THE INVENTION

The present invention is described in view of exemplary embodiments only intended to illustrate the principles of the present invention. The skilled person will be able to provide several embodiments within the scope of the claims. Throughout the description, the reference numbers of similar elements providing similar effects have the same last two digits. Further it is to be understood that in the case that an embodiment comprises a plurality of the same features then only some of the features may be labeled by a reference number.

Figure 1:
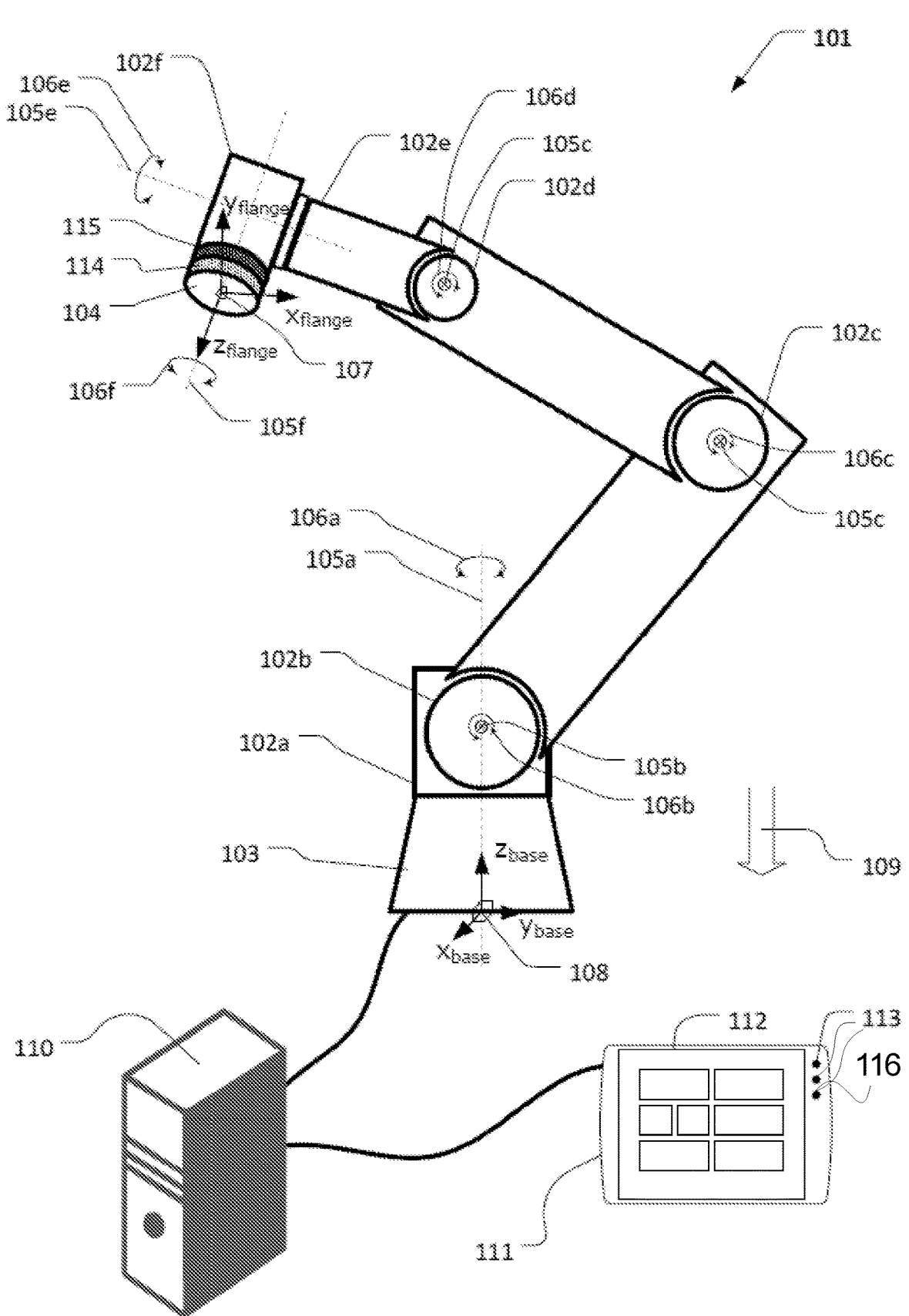
FIG. 1 illustrates a robot arm according to the present invention.

FIG. 1 illustrates a robot arm 101 comprising a plurality of robot joints 102a, 102b, 102c, 102d, 102e, 102f connecting a robot base 103 and a robot tool flange 104. A base joint 102a is configured to rotate the robot arm around a base axis 105a (illustrated by a dashed dotted line) as illustrated by rotation arrow 106a; a shoulder joint 102b is configured to rotate the robot arm around a shoulder axis 105b (illustrated as a cross indicating the axis) as illustrated by rotation arrow 106b; an elbow joint 102c is configured to rotate the robot arm around an elbow axis 105c (illustrated as a cross indicating the axis) as illustrated by rotation arrow 106c, a first wrist joint 102d is configured to rotate the robot arm around a first wrist axis 105d (illustrated as a cross indicating the axis) as illustrated by rotation arrow 106d and a second wrist joint 102e is configured to rotate the robot arm around a second wrist axis 105e (illustrated by a dashed dotted line) as illustrated by rotation arrow 106e. Robot joint 102f is a tool joint comprising the robot tool flange 104, which is rotatable around a tool axis 105f (illustrated by a dashed dotted line) as illustrated by rotation arrow 106f. The illustrated robot arm is thus a six-axis robot arm with six degrees of freedom with six rotational robot joints, however it is noticed that the present invention can be provided in robot arms comprising less or more robot joints and also other types of robot joints such as prismatic robot joints providing a translation of parts of the robot arm for instance a linear translation.

A robot tool flange reference point 107 also known as a TCP is indicated at the robot tool flange and defines the origin of a tool flange coordinate system defining three coordinate axis $x_{flange}$, $y_{flange}$, $z_{flange}$. In the illustrated embodiment the origin of the robot tool flange coordinate system has been arrange on the tool flange axis 105f with one axis ($z_{flange}$) parallel with the tool flange axis and with another axis $x_{flange}$, $y_{flange}$ parallel with the outer surface of the robot tool flange 104. Further a base reference point 108 is coincident with the origin of a robot base coordinate system defining three coordinate axis $X_{base}$, $y_{base}$, $z_{base}$. In the illustrated embodiment the origin of the robot base coordinate system has been arrange on the base axis 105a with one axis ($z_{base}$) parallel with the base axis 105a axis and with another axis $X_{base}$, $y_{base}$ parallel with at the bottom surface of the robot base. The direction of gravity 109 in relation to the robot arm is also indicated by an arrow and it is to be understood that the at robot arm can be arrange at any position and orientation in relation to gravity only limited by the freedom of operation of the robot joints.

The robot arm comprises at least one robot controller 110 configured to control robot arm 101 and can be provided as a computer comprising in interface device 111 enabling a user to control and program the robot arm. The controller can be provided as an external device as illustrated in FIG. 1 or as a device integrated into the robot arm or as a combination thereof. The interface device can for instance be provided as a teach pendent as known from the field of industrial robots which can communicate with the controller via wired or wireless communication protocols. The interface device can for instanced comprise a display 112 and a number of input devices 113 such as buttons, sliders, touchpads, joysticks, track balls, gesture recognition devices, keyboards etc. The display may be provided as a touch screen acting both as display and input device. The interface device can also be provided as an external device configured to communicate with the robot controller for instance as smart phones, tablets, PCs, laptops, etc.

The robot tool flange 104 comprises a force-torque sensor 114 (sometimes referred to simply as fore sensor) integrated into the robot tool flange 104. The force-torque sensor 114 provides a tool flange force signal indicating a force-torque provided at the robot tool flange. In the illustrated embodiment the force-torque sensor is integrated into the robot tool flange and is configured to indicate the forces and torques applied to the robot tool flange in relation to the robot tool flange reference point 107. The force sensor 114 provides a force signal indicating a force provided at the tool flange. In the illustrated embodiment the force sensor is integrated into the robot tool flange and is configured to indicate the force-torque applied to the robot tool flange in relation to the reference point 107 and in the tool flange coordinate system. However, the force-torque sensor can indicate the force-torque applied to the robot tool flange in relation to any point which can be linked to the robot tool flange coordinate system. In one embodiment the force-torque sensor is provided as a six-axis force-torque sensor configured to indicate the forces along and the torques around three perpendicular axis. The force-torque sensor can for instance be provided as any force-torque sensor capable of indicating the forces and torques in relation to a reference point for instance any of the force-torque sensors disclosed by WO2014/110682A1, U.S. Pat. No. 4,763,531, US2015204742. However, it is to be understood that the force sensor in relation to the present invention not necessarily need to be capable of sensing the torque applied to the tool sensor. It is noted that the force-torque sensor may be provided as an external device arranged at the robot tool flange or omitted.

An acceleration sensor 115 is arranged at the robot tool joint 102f and is configured to sense the acceleration of the robot tool joint 102f and/or the acceleration of the robot tool flange 104. The acceleration sensor 115 provides an acceleration signal indicating the acceleration of the robot tool joint 102f and/or the acceleration of the robot tool flange 104. In the illustrated embodiment the acceleration sensor is integrated into the robot tool joint and is configured to indicate accelerations of the robot tool joint in the robot tool coordinate system. However, the acceleration sensor can indicate the acceleration of the robot tool joint in relation to any point which can be linked to the robot tool flange coordinate system. The acceleration sensor can be provided as any accelerometer capable of indicating the accelerations of an object. The acceleration sensor can for instance be provided as an IMU (Inertial Measurement Unit) capable of indicating both linear acceleration and rotational accelerations of an object. It is noted that the acceleration sensor may be provided as an external device arranged at the robot tool flange or omitted.

Each of the robot joints comprises a robot joint body and an output flange rotatable or translatable in relation to the robot joint body and the output flange is connected to a neighbor robot joint either directly or via an arm section as known in the art. The robot joint comprises a joint motor configured to rotate or translate the output flange in relation to the robot joint body, for instance via a gearing or directly connected to the motor shaft. The robot joint body can for instance be formed as a joint housing and the joint motor can be arranged inside the joint housing and the output flange can extend out of the joint housing. Additionally, the robot joint comprises at least one joint sensor providing a sensor signal indicative of at least one of the following parameters: an angular and/or linear position of the output flange, an angular and/or linear position of the motor shaft of the joint motor, a motor current of the joint motor or an external force and/or torque trying to rotate the output flange or motor shaft. For instance, the angular position of the output flange can be indicated by an output encoder such as optical encoders, magnetic encoders which can indicate the angular position of the output flange in relation to the robot joint. Similarly, the angular position of the joint motor shaft can be provided by an input encoder such as optical encoders, magnetic encoders which can indicate the angular position of the motor shaft in relation to the robot joint. It is noted that both output encoders indicating the angular position of the output flange and input encoders indicating the angular position of the motor shaft can be provided, which in embodiments where a gearing have been provided makes it possible to determine a relationship between the input and output side of the gearing. The joint sensor can also be provided as a current sensor indicating the current through the joint motor and thus be used to obtain the torque provided by the motor. For instance, in connection with a multiphase motor, a plurality of current sensors can be provided in order to obtain the current through each of the phases of the multiphase motor. It is also noted that some of the robot joints may comprise a plurality of output flanges rotatable and/or translatable by joint actuators, for instance one of the robot joints may comprise a first output flange rotating/translating a first part of the robot arm in relation to the robot joint and a second output flange rotating/translating a second part of the robot arm in relation to the robot joint. As indicated above, the joint sensor can also be provided as a force and/or torque sensor or acceleration sensor. Such force and/or torque and acceleration sensor may be part of the outmost joint as indicated on FIG. 1 as the force sensor denoted 114 and acceleration sensor denoted 115.

The robot controller is configured to control the motions of the robot arm and the robot joints by controlling the motor torque provided to the joint motors based on a dynamic model of the robot arm, the direction of gravity acting 112 and the joint sensor signal.

Figure 2:
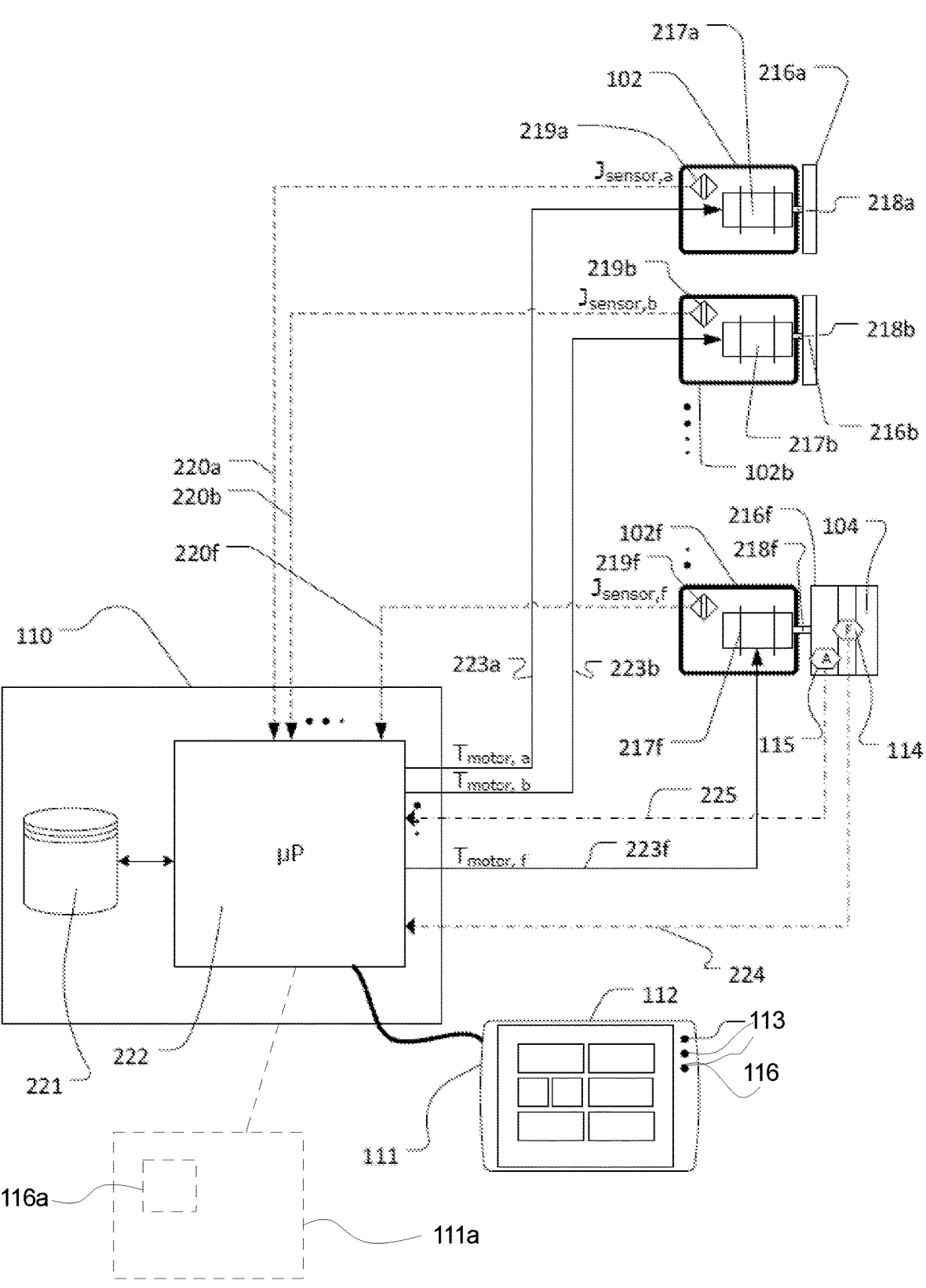
FIG. 2 illustrates a simplified structural diagram of the robot arm.

FIG. 2 illustrates a simplified structural diagram of the robot arm illustrated in FIG. 1. The robot joints 102a, 102b and 102f have been illustrated in structural form and the robot joints 102c, 102, 102e and the robot links connecting the robot joints have been omitted for the sake of simplicity of the drawing. Further the robot joints are illustrated as separate elements however it is to be understood that they are interconnected as illustrated in FIG. 1. The robot joints comprise an output flange 216a, 216b, 216f and a joint motor 217a, 217b, 217f or another kind of actuator, where the output flange 216a, 216b, 216f is rotatable in relation to the robot joint body. The joint motors 217a, 217b, 217f are respectively configured to rotate the output flanges 216a, 216b, 216f via an output axle 218a, 218b, 218f. It is to be understood that the joint motor or joint actuator may be configured to rotate the output flange via a transmission system such as a gear (not shown). In this embodiment the output flange 216f of the tool joint 123f constitutes the tool flange 104. At least one joint sensor 219a, 219b, 219f providing a sensor signal 220a, 220b, 220f indicative of at least one joint sensor parameter $J_{sensor,a}$, $J_{sensor,b}$, $J_{sensor,f}$ of the respective joint. The joint sensor parameter can for instance indicate a pose parameter indicating the position and orientation of the output flange in relation to the robot joint body, an angular position of the output flange, an angular position of a shaft of the joint motor, a motor current of the joint motor. The joint sensor parameter is selected from the list comprising: speed, acceleration, torque, motor torque, force and position. The joint sensor parameters can be measures obtained from sensors or values derived from such sensor values. For instance, the angular position of the output flange can be indicated by an output encoder such as optical encoders, magnetic encoders which can indicate the angular position of the output flange in relation to the robot joint. Similar, the angular position of the joint motor shaft can be provided by an input encoder such as optical encoders, magnetic encoders which can indicate the angular position of the motor shaft in relation to the robot joint. The motor currents can be obtained and indicated by current sensors.

The robot controller 110 comprises a processer 221 and memory 222 and is configured to control the joint motors of the robot joints by providing motor control signals 223a, 223b, 223f to the joint motors. The motor control signals 223a, 223b, 223f are indicative of the motor torque $T_{motor,a}$, $T_{motor,b}$ and $T_{motor,f}$ that each joint motor shall provide to the output flanges and the robot controller is configured to determine the motor torque based on a dynamic model of the robot arm as known in the prior art. The dynamic model makes it possible for the controller to calculate which torque the joint motors shall provide to each of the joint motors to make the robot arm perform a desired movement. The dynamic model of the robot arm can be stored in the memory 222 and be adjusted based on the joint sensor parameters $J_{sensor,a}$, $J_{sensor,b}$, $J_{sensor,f}$. For instance, the joint motors can be provided as multiphase electromotors and the robot controller can be configured to adjust the motor torque provided by the joint motors by regulating the current through the phases of the multiphase motors as known in the art of motor regulation.

Robot tool joint 102f comprises the force sensor 114 providing a tool flange force signal 224 indicating a force-torque $FT_{flange}$ provided to the tool flange. For instance, the force signal-torque $FT_{flange}$ can be indicated as a force vector $$\overrightarrow{F_{sensor}^{flange}}$$

and a torque vector $$\overrightarrow{T_{sensor}^{flange}}$$

in the robot tool flange coordinate system:

$$\overrightarrow{F_{sensor}^{flange}} = \begin{pmatrix} F_{x,sensor}^{flange} \\ F_{y,sensor}^{flange} \\ F_{z,sensor}^{flange} \end{pmatrix} \qquad \text{eq. 1}$$

where $$F^{flange}_{x,sensor}$$

is the indicated force along the $x_{flange}$ axis, $$F^{flange}_{y,sensor}$$

is the indicated force along the $y_{flange}$ axis and $$F^{flange}_{x,sensor}$$

is the indicated force along the $z_{flange}$ axis.

In an embodiment where the force sensor is provided as a combined force-torque sensor the force-torque sensor can additionally also provide a torque signal indicating the torque provide to the tool flange, for instance as a separate signal (not illustrated) or as a part of the force signal. The torque can be indicated as a torque vector in the robot tool flange coordinate system:

$$\overrightarrow{T^{flange}_{sensor}} = \begin{pmatrix} T^{flange}_{x,sensor} \\ T^{flange}_{y,sensor} \\ T^{flange}_{z,sensor} \end{pmatrix} \qquad \text{eq. 2}$$

where $$T^{flange}_{x,sensor}$$

is the indicated torque around the $x_{flange}$ axis, $$T^{flange}_{y,sensor}$$

is the indicated torque around the $y_{flange}$ axis and $$T^{flange}_{z,sensor}$$

is the indicated torque around the $z_{flange}$ axis.

Robot tool joint 102_f_ comprises the acceleration sensor 115 providing an acceleration signal 225 indicating the acceleration of the robot tool flange where the acceleration may be indicated in relation to the tool flange coordinate system $$\overrightarrow{A^{flange}_{sensor}} = \begin{pmatrix} A^{flange}_{x,sensor} \\ A^{flange}_{y,sensor} \\ A^{flange}_{z,sensor} \end{pmatrix}$$

where $$A^{flange}_{x,sensor}$$

is the sensed acceleration along the $x_{flange}$ axis $$A^{flange}_{y,sensor}$$

is the sensed acceleration along the $y_{flange}$ axis and $$A^{flange}_{z,sensor}$$

is the sensed acceleration along the $z_{flange}$ axis.

In an embodiment where the acceleration sensor is provided as a combined accelerometer/gyrometer (e.g. an IMU) the acceleration sensor can additionally provide an angular acceleration signal indicating the angular acceleration of the output flange in relation to the robot tool flange coordinate system, for instance as a separate signal (not illustrated) or as a part of the acceleration signal. The angular acceleration signal can indicate an angular acceleration vector $$\overrightarrow{\alpha^{flange}_{sensor}}$$

in the robot tool flange coordinate system $$\overrightarrow{\alpha^{flange}_{sensor}} = \begin{pmatrix} \alpha^{flange}_{x,sensor} \\ \alpha^{flange}_{y,sensor} \\ \alpha^{flange}_{z,sensor} \end{pmatrix} \qquad \text{eq. 3}$$

where $$\alpha^{flange}_{x,sensor}$$

is the angular acceleration around the $x_{flange}$ axis, $$\alpha^{flange}_{y,sensor}$$

is the angular acceleration around the $y_{flange}$ axis and $$\alpha^{flange}_{z,sensor}$$

is the angular acceleration around the $z_{flange}$ axis.

The force sensor and acceleration sensor of the illustrated robot arm are arranged at the robot tool joint 102_f_; however, it is to be understood that the force sensor and acceleration sensor can be arrange at any part of the robot arm.

The robot controller is switchable into a free-drive mode of operation, where the robot controller in the free-drive mode of operation is configured to:

maintain the robot arm in a static posture when only gravity 109 is acting on the robot arm;

allow change in posture of the robot arm when an external force different from gravity is applied to the robot arm.

When only gravity is acting on the robot arm, the robot controller can be configured to maintain the robot arm in a static posture by driving the joint motors at a state where they provide sufficient motor torque to overcome gravity without moving parts of the robot arm. The robot controller can be configured to determine the sufficient motor torque based on the dynamic model of the robot arm at the static posture. The static posture can for instance be indicated by joint sensors provided as output encoders indicating the angular position of the output flange and/or input encoders indicating the angular position of the motor shaft. The static posture can also be stored as a posture in the control software for instance by defining the joint angles of the robot joints at the static posture. In case the static posture of the robot arm is stored, the stored posture may be referred to as a way point posture to which the robot arm returns or moves to/through when operating in a robot program.

When an external force different from gravity is applied to the robot arm, the robot controller can allow change in posture by driving the joint motors with a motor torque that allows a user to rotate the output flanges of the robot joint. For instance, the robot controller can be configured to drive the motor with a motor torque sufficient for maintaining the robot arm in the static posture, and an additional force and/or torque applied to the robot arm will thus overcome the sufficient motor torque, whereby the output flange of the joints will rotate due to the additional force and/or torque. During change of the robot arm posture the robot controller can be configured to adjust the sufficient motor torque based on the changes in posture resulting in the effect that the robot arm will be maintained in the new static posture when the additional external force is reduced.

In one embodiment of the free-drive mode of operation, the robot controller can also/additionally be configured to control the motor torque of the joint motors based on the force signal 224 from the force-torque sensor 114. This makes it possible for the user to move the tool flange without manipulating each of the robot joints, for instance by pushing, pulling or rotating the robot tool flange. Additionally, in the free-drive mode of operation according to the present invention the user can also choose to manipulate the individual robot joints to change the posture of the robot arm. Consequently, the user is provided with a larger flexibility and options when changing the posture of the robot arm in free-drive mode of operation.

Figure 3:
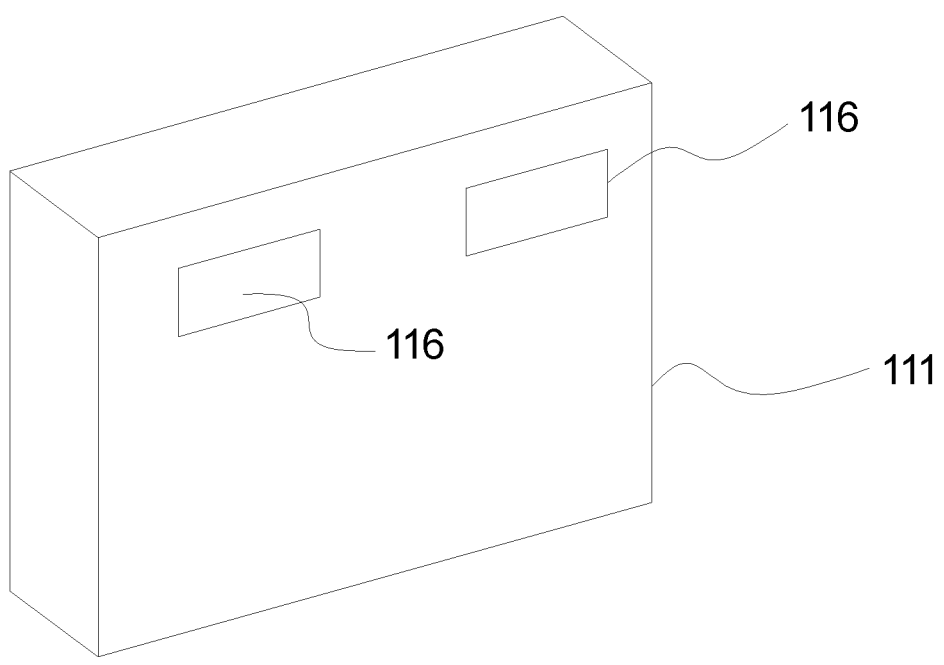
FIG. 3 illustrates an example of an interface device comprising a multifunctional input device.

FIG. 3 illustrates an interface device 111 seen from the back comprising a mechanical multifunctional input device 116; The multifunctional input device 116 (simply referred to as input device) is one of the input devices 113 illustrated on FIG. 1 and FIG. 2 multifunctional in the sense that it has more than one position and in that it can be used by a user to initiate change of operation for the robot arm 101. In an exemplary embodiment, the input device 113 has a middle position requiring light pressure/force to activate, a fully pressed position requiring a force heavier than the light pressure to activate and a none activated position requiring no pressure to activate. In some embodiments, the input device 116 may mechanically or electrically be designed to only be able to go to one position from another position e.g. that it is in its fully pressed position it cannot go to the middle position before it has been in the fully released position, etc. In one embodiment the multifunctional input device is provided as a 3-position enabling device as known in the art of safety equipment.

The input device 116 is communicatively connected to the robot controller 110 e.g. via a wired connection and sends at least two different electric signals depending on its position.

A first electric signal when it is in the middle position and a second electric position when it is in the release and fully pressed position. It should be noted that in other embodiments it may provide different electric signals depending on when being in the release and in the fully pressed position.

The electric signals may be analog signals such as a voltage that changes with position of the input device 116 or it may be a digital signal toggling with change of position of the input device 116.

An example of an interface device 111 is illustrated on FIG. 3 which corresponds to the interface device 111 illustrated on FIG. 2. On FIG. 3, the interface device 111 is seen from the back and comprising an input device 116 positioned on the back of the interface device 111. In this way it is easy to operate by the user with the hand holding the interface device. It is noted that the interface device 111 comprises two input devices 116 facilitating use of both a right and a left hand user.

FIG. 2 illustrates in dotted lines an auxiliary interface device 111a comprising an auxiliary input device 116a. The functionality of the input device(s) 116 of FIG. 3 and the auxiliary input device 116a of FIG. 2 are the same and therefore the above description also applies to the auxiliary input device 116a.

In the embodiment where two interface devices 111, 111a are available it is possible for two users to apply the predefined sequences and thereby control state or movement of the robot arm 101. With respect to the stopping of the robot arm upon applying the first predetermined sequence, the first part i.e. the light press to the middle position of the input device 116 should be made on both input devices 116, 116a to allow the robot arm to operate. However, just one of the input devices 116, 116a should be released or pressed harder to fully pressed position to stop the robot arm 101.

In an embodiment, the interface 111 and functions or sequences initiated from this interface device 111 is prioritized over functions or sequences initiated from the auxiliary interface device 111a and vice versa.

The particular embodiment illustrated in FIG. 3 comprises two multifunctional input devices 116 which each have the same functionality. That is, a first predetermined sequence of activation can be applied to either one or the other of the two input devices 116 to change mode of operation to a stop mode. And a second predetermined sequence of activation can be applied to either one or the other of the two input devices 116 to change mode of operation to a second mode. Having two such input devices with the same functionality may enable both left-hand and right-hand users to easily operate the device. Other embodiments may have just one multifunctional input devices. Even other embodiments may have a first multifunctional input device with a first functionality, whereas other embodiments may have a second multifunctional input device with a second functionality, wherein the first and second functionalities are different.

Figure 4:
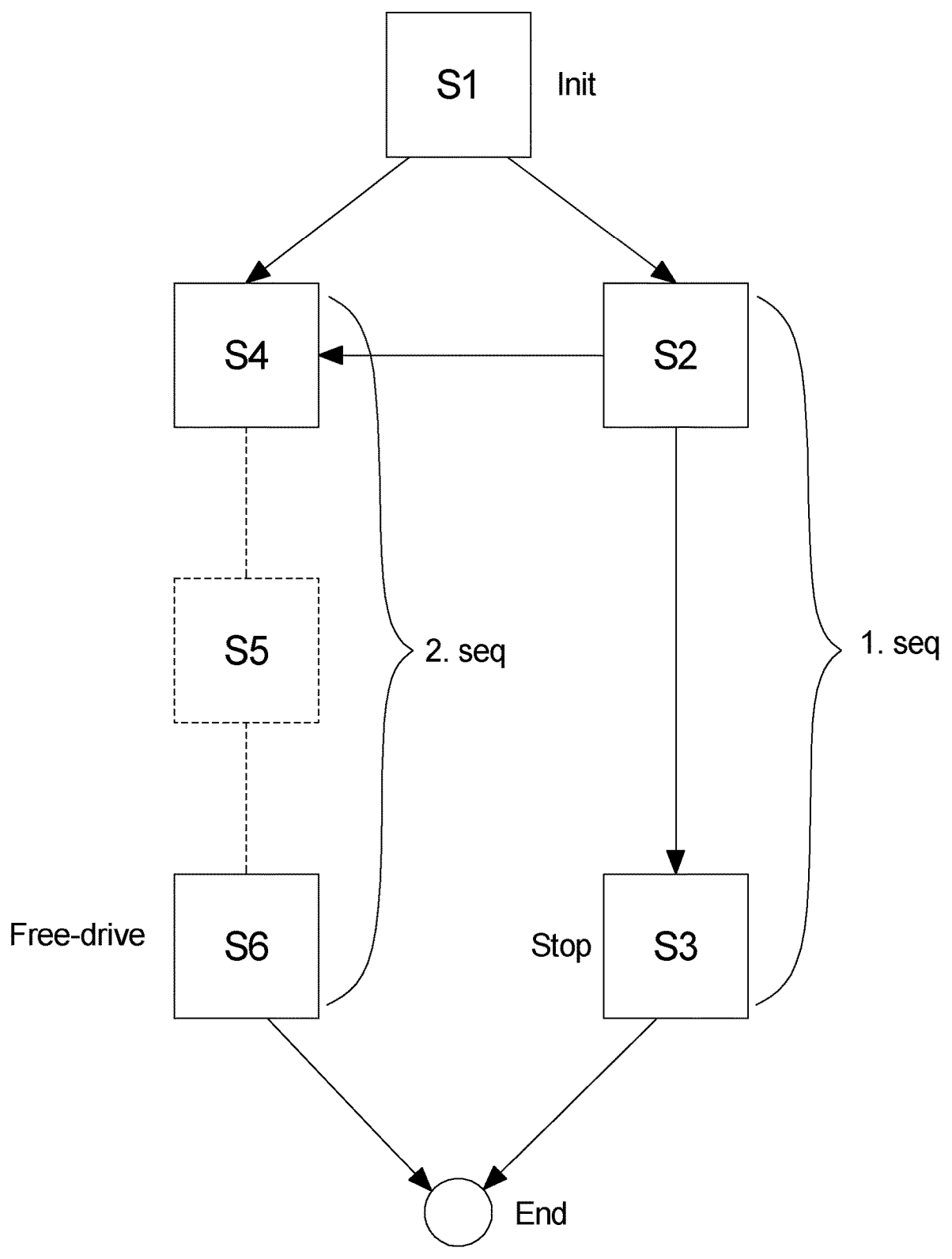
FIG. 4 illustrates a flow chart of the use of the multifunctional input device.

FIG. 4 illustrates a flow chart of one way of implementing the use of a multifunctional input device 116 according to an embodiment of the invention. The first step S1 is the initial step where the robot arm 101 needs to be of is brought into a mode of operation in which the input device 116 can be used to change mode of operation of the robot arm 101, for example away from a present mode, such as a third mode. Depending on which functionality or mode of operation that is required from activation of the input device 116, the robot arm 101 needs to be brought into different modes. If the input device is to be used to stop the robot arm 101 and/or into free-drive mode, then the robot arm 101 should be brought into manual mode.

To go to step S2, a light pressure is to be applied to the input device 116 to force into its middle position. This could be either an indication of the user would like to apply a first predetermined sequence of activation of the input device 116 (simply referred to as first sequence) or a second predetermined sequence of activation of the input device 116 (simply referred to as second sequence). In this embodiment, to distinguish between the first and second sequence a timer starts when the input device 116 is in the middle position. If a threshold time of e.g. between 5 miliseconds (ms) and 2000 ms passes, this is an indication that the first sequence is to be applied and if the input device 116 change position from the middle position before the threshold time passes this is an indication that the second sequence is to be applied and the robot arm control goes into step S4.

Since the middle position was held for more than the threshold time the first part of the first sequence has been applied. The second part is either a release or a full pressure position of the input device 116. No matter if these two position of the input device communicates the same or two different signals to the robot controller 110, this is the second part of the first sequence and thereby the signal that brings the robot arm control into step S3 where it stops.

While being in step S2, because the robot arm is in manual mode, the robot controller 110 is allowed to execute or play the program moving the robot arm 101. In this way, the user is able to monitor how the robot arm 101 moves as the program is executed/played. If something is not as intended whether or not it is hazardous, the user is able to change the position of the input device 116 and stop the operation/ movement of the robot arm/bring the robot arm in one of possible several stop modes.

The robot arm control can also be brought into step S4 from activation of the input device 116 e.g. by applying force to bring it into its full pressure position. In this particular embodiment, the input device in the middle position less than the threshold time or in the fully pressed position brings the robot arm control into step S4 and is at the same time the first part of the second sequence.

The second sequence can comprise several different activations of the input device 116 illustrated by the dotted line and step S5 before the robot arm control, in this particular embodiment ends in step S6 where the robot arm control is brought into free-drive mode.

As indicated above FIG. 4 only illustrates an example of how the input device 116 can be used to bring the robot arm from one particular mode of operation into another particular mode of operation by one example of activation sequences of the input device 116. Obviously, there are several other combinations of activation of the input device 116 that may form one sequence of activation that can change mode of operation of the robot arm or force the robot arm to move to one particular location and/or move in one particular position. This also includes a series of activations on the input device 116 such as several light presses leading to several middle positions one after each other e.g. with a predetermined time.

Further, as it is possible to stop the operation of the robot arm, it may also be possible to pause the program execution and subsequently return to execution mode via input from the input device. Such pause may e.g. be used to change something in the robot cell.

Further, as indicated, the robot arm 101 may, for security reasons, need to be in a particular mode or position before a sequence can be applied to change a mode of operation. As an example, it could be mentioned, that the robot arm must return to its start position for the program to run (program software to be executed by the robot controller). Moving the robot arm into position may also be done by applying a sequence of activations to the input device 116 alone or in combination with interactions made via the display 112.

The time range mentioned above between 5 ms and 2000 ms is an example of a suitable time range. In most cases, to determine if one activation of the input device 116 or lack therefore should move the robot arm control (also referred to as state machine below) into one of two or three states, an appropriate time is between 25 ms and 750 ms such as 50 ms, 100 ms, 200 ms, 250 ms, 300 ms, 400 ms, 500 ms, etc.

Figure 5:
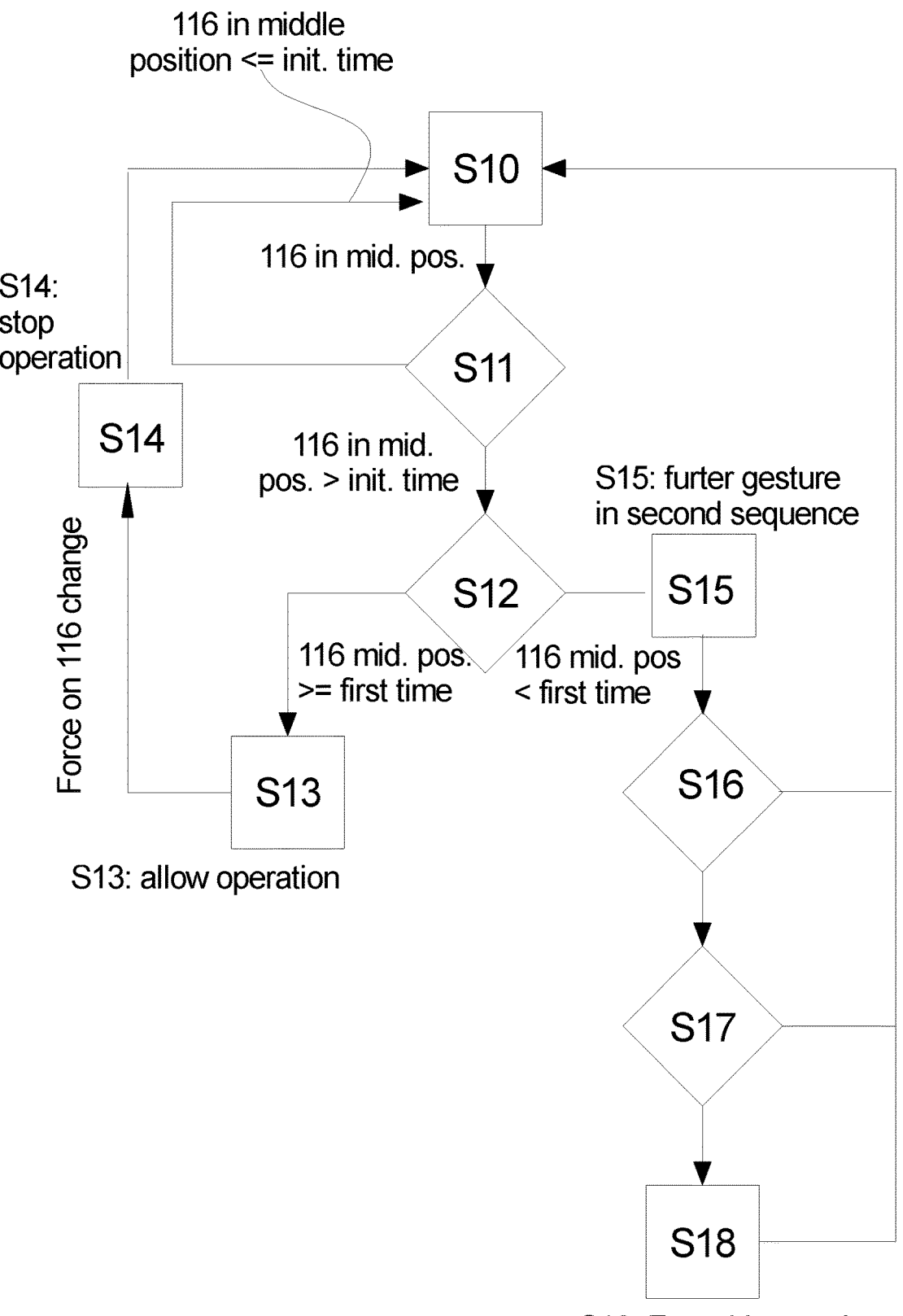
FIG. 5 illustrates a flow chart of a specific implementation of an embodiment of the invention.

FIG. 5 illustrates a specific implementation of an embodiment of the invention through steps S10-S16 of a state machine. In the first step S10, according to this particular embodiment, the robot arm 101 is in teach mode (also sometimes referred to as programming mode). If in step S10, the input device 116 is pressed, the state machine moves to step S11 where it waits for a period of e.g. 50 ms counting from the input device 116 was pressed in step S10. If the input device 116 continues to be pressed for more than the 50 ms the state machine moves to step S12. If the input device 116 is pressed less than the 50 ms, it is assumed that the force applied to press the input device 113 was applied by mistake and the state machine returns to step S10.

In step S12 it is determined if the user intents to apply the first sequence or the second sequence. This is determined based on a measure of time the input device 116 is pressed. In this particular embodiment, if the input device 116 is pressed longer than e.g. 200 ms counted from step S11, this matches with the first sequence and hence the state machine moves to step S13. Here it stays until the input device 116 is released or forced into its fully activated state and the robot arm is stopped in step S14. When this happens, the state machine moves back to state S10 and is ready to start a new sequence again.

If, in step S12, the time the input device 116 is pressed is below 200 ms, this matches with the second sequence and the state machine moves to step S15 indicating that the user has started the second sequence. The next gesture in the second sequence is releasing the input device 116. Again, the time the input device 116 is released is measured and compared to a predetermined time such as a second period of time in step S16. If the input device 116 is released more e.g. more than 500 ms counting from step S12, the state machine returns back to step S10 and is ready to start a new sequence again. If, however, the input device 116 is pressed again within the 500 ms counting from step S12, the state machine moves to step S17.

Again, in step S17 the time the input device 116 is pressed is measured and compared to a predetermined time such as a second period of time. If the input device 116 is released before e.g. 250 ms has passed since step S15, the state machine moves back to step S10 and is ready to start a new sequence again. If, however, the input device 116 continues to be pressed longer than the 250 ms, the state machine moves to step S18. Here, the robot arm change mode of operation to free-drive mode and it remains in free-drive mode until the input device 116 is released. Upon releasing, the state machine returns to step S10 and is ready to start a new sequence again.

A non-limiting extra step could be included after step S17 to account for an unintentional release of the input device in less than e.g. 50 ms. If the input device is pressed again within the 50 ms, the state machine remains in free-drive mode.

As mentioned, the implementation of the first and second sequences described with reference to FIG. 5 is only one non-limiting example of implementation of the two sequences. Additional, gestures or steps could be implemented as well as if possible, the feature of different electric signals from a middle position and fully pressed position could be exploited.

Hence, in an embodiment, when the robot arm control is in teach mode, the first sequence may be a stop sequence and the second sequence may be a free-drive sequence. Similarly, when the robot arm control is in run mode, the first sequence may be a stop position sequence and the second sequence may be a start position sequence.

From the above, it is now clear that the present invention relates to a robot arm that in dependency of which mode its control program is in, can change mode of operation from activation of a mechanical multifunctional input device 116. The input device is multifunctional in the 1) it has several positions that may provide different electric signals to the robot controller and 2) in dependency of a sequence of activation of the input device from a user, the robot controller is able to either stop the robot arm or change mode of operation of the robot arm. Examples of such sequences are described with respect to FIGS. 4 and 5.

As an example, if the robot arm control program is in teach/programming mode then, via the input device, the user of the robot arm is able to stop operation of the robot arm by applying a first sequence of activations of the input device and bring the robot arm in free-drive mode by applying a second sequence of activation of the input device. Teach/program mode is the mode where the user can program or test operation of the robot arm.

As another example, if the robot arm control program is in run mode then, via the input device, the user of the robot arm is able to bring the robot arm into start position e.g. defined by a particular posture in a particular location in the robot cell. Run mode is the mode where the user can execute operation of the robot arm according to the robot arm control software.

In an embodiment of the invention, a robot arm is controlled by a robot controller which is communicatively connected to an interface device comprising a mechanical multifunctional input device. The robot arm has multiple modes of operation which a user can activate.

The mechanical multifunctional input device serves as a means for accessing and changing these modes.

Whichever mode of operation of the robot arm is currently active, a user can apply a first predetermined sequence of activation to change the mode of operation to change the mode of operation to a stop mode. Regardless of whether the robot is currently in run mode, teach mode, test mode, or another mode of operation, whenever the first predetermined sequence of activation is applied, the mode of operation is changed to the stop mode.

Similarly, whichever mode of operation of the robot arm is currently active, the user can apply a second predetermined sequence of activation to change the mode of operation to a second mode. In this particular embodiment, the second mode is a free-drive mode of operation. Regardless of whether the robot is currently in run mode, teach mode, test mode, or another mode of operation, whenever the second predetermined sequence of activation is applied, the mode of operation is changed to this second mode.

The currently active mode of this embodiment is referred to as the third mode. Thus, when the robot arm is in an, arbitrary, third mode of operation, the mode of operation can be changed into a second mode and a stop mode, depending on applying predetermined sequences of activation.

Accordingly, from the above it is clear that at least the problem of avoiding unintentional activation of free-drive mode is solved. Today, interface devices have several buttons including one for stopping and one for activating free-drive mode which a user might confuse. Further, from the above it is clear that a more simple layout of the interface device is facilitated by the present invention by integrating a multifunctional input device in the interface device instead of having one button (referred to as input device) (or two buttons) for each function on the interface device.

BRIEF DESCRIPTION OF FIGURE REFERENCES

101: robot arm;
102a-102f: robot joint
103: robot base
104: robot tool flange
105a-105f: robot joints axis
106a-106f: rotation arrow of robot joints
107: robot tool flange reference point
108: base reference point
109: Direction of gravity
110: Robot controller
111: interface device
111a: auxiliary interface device
112: display
113: input device
114: force-torque sensor
115: acceleration sensor
116, 116a: mechanical multifunctional input device, auxiliary mechanical multifunctional
input device
216a, 216b, 216f: output flange
217a, 217b, 2179f: joint motors
218a, 218b, 218f: output axle
219a, 219b, 219f: joint sensor
220a, 220b, 220f: joint sensor signal
221: processor
222: memory
223a, 223b, 223f: motor control signals
224: force-torque signal

The invention claimed is:

1. A system comprising:
  a robotic arm comprising:
    joints;
    a base; and
    a tool flange, the joints mechanically connecting the base and the tool flange;
  a controller configured to control movement of the joints to control movement of the tool flange; and
  an input device, the input device being configured to receive activation sequences to enable the controller to change a mode of operation of the robotic arm, the controller being configured to perform operations comprising:
    changing a mode of operation of the robotic arm to a stop mode in response to a first activation sequence received on the input device, the stop mode comprising a first mode, the first activation sequence comprising first operations, at least one of the first operations being performed for a first predetermined time; and
    changing the mode of operation of the robotic arm to a second mode in response to a second activation sequence received on the input device, the second activation sequence comprising second operations, at least one of the second operations being performed for a second predetermined time;

wherein the mode of operation of the robotic arm is changed in response to the first activation sequence or the second activation sequence when the robotic arm is in a third mode of operation.

2. The system of claim 1, wherein the controller is configured to cause the robotic arm to enter the stop mode, thereby causing the robotic arm to stop, in response to the first activation sequence when the robotic arm is in a teach mode or a test mode.

3. The system of claim 2, wherein causing operation of the robotic arm to stop comprises terminating operation of the robotic arm and thereby bringing the robotic arm to a standstill.

4. The system of claim 1, wherein the second mode comprises a free-drive mode configured to:

maintain the robotic arm in a static posture when only gravity is acting on the robotic arm; and allow a change in posture of the robotic arm when an external force different from gravity is applied to the robotic arm.

5. The system of claim 1, wherein the input device comprises a physical button having at least a release position, a middle position, and a fully activated position.

6. A system comprising:

a robotic arm comprising:

joints;

a base; and a tool flange, the joints mechanically connecting the base and the tool flange;

a controller configured to control movement of the joints to control movement of the tool flange;

an interface device communicatively connected to the controller; and an input device associated with the interface device, the input device being configured to receive activation sequences to enable the controller to change a mode of operation of the robotic arm, the controller being configured to perform operations comprising:

changing a mode of operation of the robotic arm to a stop mode in response to a first activation sequence received on the input device, the stop mode comprising a first mode; and changing the mode of operation of the robotic arm to a second mode in response to a second activation sequence received on the input device;

wherein the mode of operation of the robotic arm is changed in response to the first activation sequence or the second activation sequence when the robotic arm is in a third mode of operation;

wherein the input device comprises a physical button having at least a release position, a middle position, and a fully activated position; and wherein first activation sequence comprises:

in response to the input device being in the middle position, the controller receiving a first electric signal and starting a timer;

in response to the input device being in the middle position for at least a first period of time, the controller allowing operation of the robotic arm after the first period of time; and either one of the following operations:

in response to moving the input device to the release position, the first electric signal changing and, in response, the robot controller causing the robotic arm to stop operation; or in response to the input device moving to the fully activated position, the first electric signal changing and, in response, the robot controller causing the robotic arm to stop operation.

7. The system of claim 6, wherein the controller is configured to reset the timer in response to the input device not being in the middle position for an initial first period of time, the initial first period of time being more than 0 ms (milliseconds) and less than the first period of time.

8. The system of claim 7, wherein changing the first electric signal in response to moving the input device to the release position comprises the first electric signal changing to a second electric signal.

9. The system of claim 8, wherein changing the first electric signal in response to the input device moving to the fully activated position comprises the first electric signal to changing to a third electric signal.

10. The system of claim 6, wherein the first period of time is between 10 ms (milliseconds) and 2000 ms, is between 40 ms and 1000 ms, is between 45 ms and 550 ms, or is 200 ms.

11. The system of claim 6, wherein the second activation sequence comprises:

forcing the input device to the middle position and then, within a time period that is less than a second period of time, releasing the input device to the release position;

forcing the input device to the middle position and then, within the time period that is less than the second period of time, forcing the input device to the fully activated position;

forcing the input device to the fully activated position and then, within the time period that is less than the second period of time, releasing the input device to the release position; or forcing input device to the fully activated position and then, within the time period that is less than the second period of time, releasing the input device to the middle position.

12. The system of claim 11, wherein the second period of time is between 10 ms (milliseconds) and 2000 ms, is between 40 ms and 1000 ms, is between 45 ms and 550 ms, or is 200 ms.

13. The system of claim 11, wherein at least one of:

a time period of forcing the input device to the middle position is longer than an initial second period of time; or a time period of forcing the input device to fully activated position is longer than the initial second period of time;

wherein the initial second period of time is more than Oms (milliseconds) and less than the second period of time.

14. The system of claim 11, wherein the second activation sequence comprises at least one of:

moving the input device to the release position and then, within a third period of time, forcing the input device to the fully activated position or to the middle position;

forcing the input device to the fully activated position and then, within the third period of time, releasing the input device to the release position or to the middle position; or forcing the input device to the middle position and then, within the third period of time, releasing the input device to the release position or forcing the device to the fully activated position.

15. The system of claim 14, wherein the third period of time is between 200 ms (milliseconds) and 2000 ms, is between 300 ms and 1000 ms, or is between 400 ms and 550 ms.

16. The system of claim 1, wherein the controller is configured to change the mode of operation of the robotic arm in response to the second activation sequence and a present mode of operation of the robotic arm.

17. The system of claim 16, wherein the controller is configured to change the mode of operation of the robotic arm from a teach mode of operation to a free-drive mode of operation in response to the second activation sequence;

wherein the controllers configured to change the mode of operation of the robotic arm from a test mode of operation to a move mode of operation in response to the second activation sequence; and wherein, in the move mode, the controller is configured to cause the robotic arm to move to a start position.

18. The system of claim 1, further comprising:

an interface device communicatively connected to the controller; and an auxiliary interface that is communicatively connected to the controller and that is physically separate from the interface device, the auxiliary interface device being associated with the auxiliary input device.

19. The system of claim 18, wherein a first part of the first activation sequence is receivable on the input device or the auxiliary input device; and wherein a second part of the first activation sequence is receivable on the input device or the auxiliary input device.

20. The system of claim 18, wherein the controller is configured to the cause the robotic arm to move to a start position in response to a third activation sequence received on the input device from a user.

21. The system of claim 20, wherein the second activation sequence or the third activation sequence comprises operation of the input device or operation of the auxiliary input device.

22. The system of claim 1, wherein the third mode of operation comprises: run mode, test mode, or teach mode.

23. The system of claim 18, wherein the interface device is connected to the controller by wire.

24. The system of claim 18, wherein the interface device comprises a teach pendent, the teach pendant comprising the input device and a display.

25. The system of claim 1, wherein the third mode of operation comprises a present mode.

26. The system of claim 1, wherein the robotic arm is in the third mode of operation prior to the controller changing the mode of operation of the robotic arm.

27. The system of claim 1, wherein the third mode of operation comprises teach mode or test mode.

28. The system of claim 1, wherein the controller is configured to change the mode of operation of the robotic arm to an operation mode in response to a first subset of first operations in the first activation sequence.

29. The system of claim 28, wherein the controller is configured to change the mode of operation of the robotic arm to an operation mode in response to applying a first subset of second operations in the second activation sequence.

30. The system of claim 29, wherein the first subset of first operations in the first activation sequence and the first subset of second operations in the second activation sequence are identical.

31. The system of claim 1, wherein the second mode comprises a move mode.

32. The system of claim 1, wherein the second mode comprises a free-drive mode when the third mode is a teach mode.

33. The system of claim 1, wherein the second mode comprises a move mode when the third mode is a test mode.

34. The system of claim 1 wherein the controller is configured to change, in response to the first activation sequence, the mode of operation of the robotic arm to the stop mode when the third mode of operation is at least one of a run mode or a test mode.

35. A method of controlling a robotic arm using an interface device, the interface device being associated with an input device, the interface device being in communication with a controller for the robotic arm, the method comprising:

the controller receiving a first set of electric signals at a first time in response to a first activation sequence received at the input device, the first activation sequence comprising first operations, at least one of the first operations being performed for a first predetermined time;

the controller causing the robotic arm to operate in a stop mode based on the first set of electric signals, the stop mode comprising a first mode of operation;

the controller receiving a second set of electric signals at a second time in response to a second activation sequence received at the input device, the second activation sequence comprising second operations, at least one of the second operations being performed for a second predetermined time; and the controller causing the robotic arm to operate in a second mode of operation based on the second set of electric signals;

wherein the controller causes the robotic arm to change a mode of operation in response to the first activation sequence or the second activation sequence when the robotic arm is in a third mode of operation.

36. The method of claim 35, wherein the robotic arm comprises:

joints;

a base; and a tool flange, the joints mechanically connecting the base and the tool flange; and wherein the controller controls movement of the joints.

37. The method of claim 35, wherein the first mode of operation or the second mode of operation comprises a free-drive mode of operation, the free-drive mode of operation comprising:

maintaining the robotic arm in a static posture when only gravity is acting on the robot arm; and allowing a change in posture of the robotic arm when an external force different from gravity is applied to the robotic arm.

38. A controller for a robotic arm, the controller being responsive to an input device, the input device for receiving activation sequences for changing a mode of operation of the robotic arm, wherein the controller is configured to perform operations comprising:

changing a mode of operation of the robotic arm to a stop mode in response to a first activation sequence received on the input device, the stop mode comprising a first mode, the first activation sequence comprising first operations, at least one of the first operations being performed for a first predetermined time; and changing the mode of operation of the robotic arm to a second mode in response to a second activation sequence received on the input device, the second activation sequence comprising second operations, at least one of the second operations being performed for a second predetermined time;

wherein the controller is configured to change the mode of operation of the robotic arm in response to the first activation sequence or the second activation sequence of activation when the robotic arm is in a third mode of operation.

39. The controller of claim 38, wherein the robotic arm comprises:

joints;

a base; and a tool flange, the joints mechanically connecting the base and the tool flange; and wherein the controller is configured to control movement of the joints.

40. A system comprising:

a robotic arm comprising joints mechanically connecting a base and a tool flange; and a controller configured to control movement of the joints to control movement of the tool flange, the controller being responsive to an input device configured to receive activation sequences to enable changing a mode of operation of the robotic arm;

wherein the controller is configured to perform operations comprising:

changing a mode of operation of the robotic arm to a stop mode in response to a first activation sequence received on the input device, the stop mode comprising a first mode, the first activation sequence comprising first operations, at least one of the first operations being performed for a first predetermined time; and changing the mode of operation of the robotic arm to a second mode in response to a second activation sequence received on the input device, the second activation sequence comprising second operations, at least one of the second operations being performed for a second predetermined time;

wherein the controller is configured to change the mode of operation of the robotic arm in response to the first activation sequence or the second activation sequence when the robotic arm is in a third mode of operation.

41. The system of claim 40, further comprising:

an interface device; and an auxiliary interface device that is different from the interface device.

\* \* \* \* \*